(12) United States Patent
Jeong et al.

(10) Patent No.: US 8,294,753 B2
(45) Date of Patent: Oct. 23, 2012

(54) IMAGE DISPLAY DEVICE AND METHOD OF DRIVING THE SAME

(75) Inventors: Woonam Jeong, Gyeonggi-do (KR); Hoon Kang, Gyeonggi-do (KR); Insu Baik, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 790 days.

(21) Appl. No.: 12/478,351

(22) Filed: Jun. 4, 2009

(65) Prior Publication Data
US 2010/0097449 A1  Apr. 22, 2010

(30) Foreign Application Priority Data
Oct. 17, 2008  (KR) .................. 10-2008-0102188

(51) Int. Cl.
*H04N 13/04*  (2006.01)
(52) U.S. Cl. ........................................... 348/59
(58) Field of Classification Search .............. 348/59
See application file for complete search history.

(56) References Cited

U.S. PATENT DOCUMENTS

| | | | |
|---|---|---|---|
| 6,795,241 B1 * | 9/2004 | Holzbach | 359/463 |
| 7,058,252 B2 * | 6/2006 | Woodgate et al. | 385/16 |
| 7,969,463 B2 * | 6/2011 | Takaki | 348/59 |
| 8,029,139 B2 * | 10/2011 | Ellinger et al. | 353/7 |
| 8,149,342 B2 * | 4/2012 | Ijzerman et al. | 349/15 |
| 2008/0055933 A1 * | 3/2008 | Vissenberg et al. | 362/620 |
| 2009/0050844 A1 * | 2/2009 | Yamazaki et al. | 252/299.61 |
| 2009/0322862 A1 * | 12/2009 | Marie Vissenberg et al. | 348/59 |

FOREIGN PATENT DOCUMENTS

GB  2496731  *  4/2005

* cited by examiner

*Primary Examiner* — Larry Donaghue
(74) *Attorney, Agent, or Firm* — Morgan, Lewis & Bockius LLP

(57) ABSTRACT

An image display device and a method of driving the same are provided. The image display device includes a lenticular lens array, a first backlit display element that is positioned on the lenticular lens array and is driven at a frame frequency of N×60 Hz, where N is an integer equal to or greater than 1, and a light source module under the lenticular lens array. The first backlit display element displays a video signal of a 2D format in a 2D mode and displays a video signal of an N-view 3D format in a 3D mode. The light source module irradiates light in the form of a surface light source onto the lenticular lens array in the 2D mode and irradiates light in the form of a plurality of line light sources onto the lenticular lens array in the 3D mode.

13 Claims, 26 Drawing Sheets

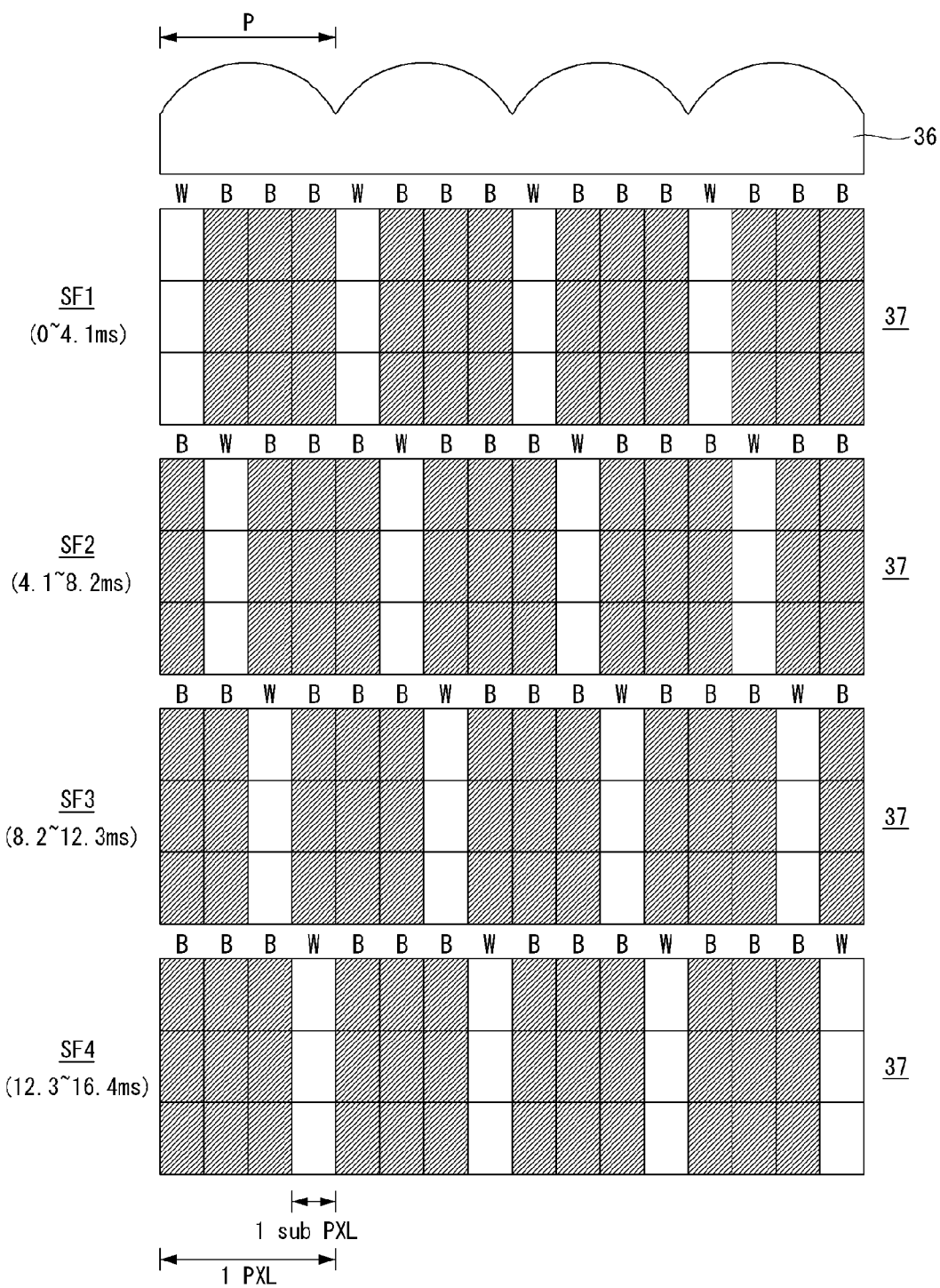

Drive at 120 Hz in 2D mode for 0-8 ms

Drive at 180 Hz in 2D mode for 0-5.5 ms

Drive at 180 Hz in 2D mode for 5.5-11 ms

Drive at 180 Hz in 2D mode for 11-16.5 ms

Drive at 240 Hz in 2D mode for 0-4.1 ms

Drive at 240 Hz in 2D mode for 8.2-12.3 ms

Drive at 240 Hz in 2D mode for 12.3-16.4 ms

IMAGE DISPLAY DEVICE AND METHOD OF DRIVING THE SAME

This application claims the benefit of Korea Patent Application No. 10-2008-0102188 filed on Oct. 17, 2008, the entire contents of which is incorporated herein by reference for all purposes as if fully set forth herein.

BACKGROUND OF THE INVENTION

1. Field of the Invention

Embodiments of the invention relate to an image display device capable of displaying a 2-dimensional (2D) image and a 3-dimensional (3D) image and a method of driving the same.

2. Discussion of the Related Art 3D image display devices stereoscopically display an image using a perspective feeling appearing when different video signals a user perceives through his or her both eyes are combined. The 3D image display devices may be mainly classified into a stereoscopic type, a volumetric type, and a holographic type.

The stereoscopic type 3D image display devices may be divided into a glasses type and a non-glasses type. Recently, the non-glasses type stereoscopic 3D image display devices have been briskly studied. The non-glasses type stereoscopic 3D image display devices may be divided into a parallax barrier type and a lenticular lens type.

In the parallax barrier type non-glasses stereoscopic 3D image display device, vertically thin slits are arranged at a constant distance so as to transmit or shield light, and right and left images are accurately divided through the slits at a predetermined time point. Hence, a 3D image can be displayed. In the parallax barrier type non-glasses stereoscopic 3D image display device, there are problems, such as a reduction in brightness caused by a barrier, a fabrication difficulty, and diffraction.

In the lenticular lens type non-glasses stereoscopic 3D image display device, as shown in FIG. 1, a plurality of semi-cylindrical lenticular lenses 1 are attached on a liquid crystal display (LCD) panel 2 and allows a viewer's right and left eyes to watch different pixels. Hence, right and left images are divided to thereby display a 3D image. As shown in FIG. 2, the lenticular lens type non-glasses stereoscopic 3D image display device has a structure in which the viewer watches only a portion of subpixels of the LCD panel 2 at a predetermined position. If the lenticular lens type non-glasses stereoscopic 3D image display device uses a LCD panel with a FHD resolution (1920×1080) using a multi-view technique (for example, 9-view technique), a 3D image with a greatly reduced resolution (i.e., VGA resolution (640×480)) may be displayed. In FIG. 2, P denotes a pitch of the lenticular lens 1, and Or denotes a refractive angle of the lenticular lens 1.

SUMMARY OF THE INVENTION

Embodiments provide an image display device capable of displaying a 2-dimensional (2D) image and a 3-dimensional (3D) image without a resolution reduction and capable of performing a switching between the 2D image and the 3D image and a method of driving the same.

In one aspect, there is an image display device comprising a lenticular lens array, a first backlit display element that is positioned on the lenticular lens array and is driven at a frame frequency of N×60 Hz, where N is an integer equal to or greater than 1, and a light source module that is positioned under the lenticular lens array and irradiates light onto the lenticular lens array using a plurality of electrically individually controllable pixels, wherein the first backlit display element displays a video signal of a 2-dimensional (2D) format in a 2D mode and displays a video signal of an N-view 3-dimensional (3D) format in a 3D mode, wherein the light source module irradiates light in the form of a surface light source onto the lenticular lens array in the 2D mode and irradiates light in the form of a plurality of line light sources, that are spaced apart from one another at a uniform distance, onto the lenticular lens array in the 3D mode.

In another aspect, there is a method of driving an image display device comprising positioning a first backlit display element on a lenticular lens array to drive the first backlit display element at a frame frequency of N×60 Hz, where N is an integer equal to or greater than 1, positioning a light source module including a plurality of electrically individually controllable pixels under the lenticular lens array to irradiate light onto the lenticular lens array, controlling light from the light source module into light in the form of a surface light source in a 2-dimensional (2D) mode to display a video signal of a 2D format on the first backlit display element, and controlling light from the light source module into light in the form of a plurality of line light sources, that are spaced apart from one another at a uniform distance, in a 3-dimensional (3D) mode to display a video signal of an N-view 3D format on the first backlit display element.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 6 illustrates a white pattern and a black pattern displayed on the active light splitting element when the image display device is driven at a frame frequency of 240 Hz;

DETAILED DESCRIPTION OF THE EMBODIMENTS

Reference will now be made in detail embodiments of the invention examples of which are illustrated in the accompanying drawings.

Figure 1:
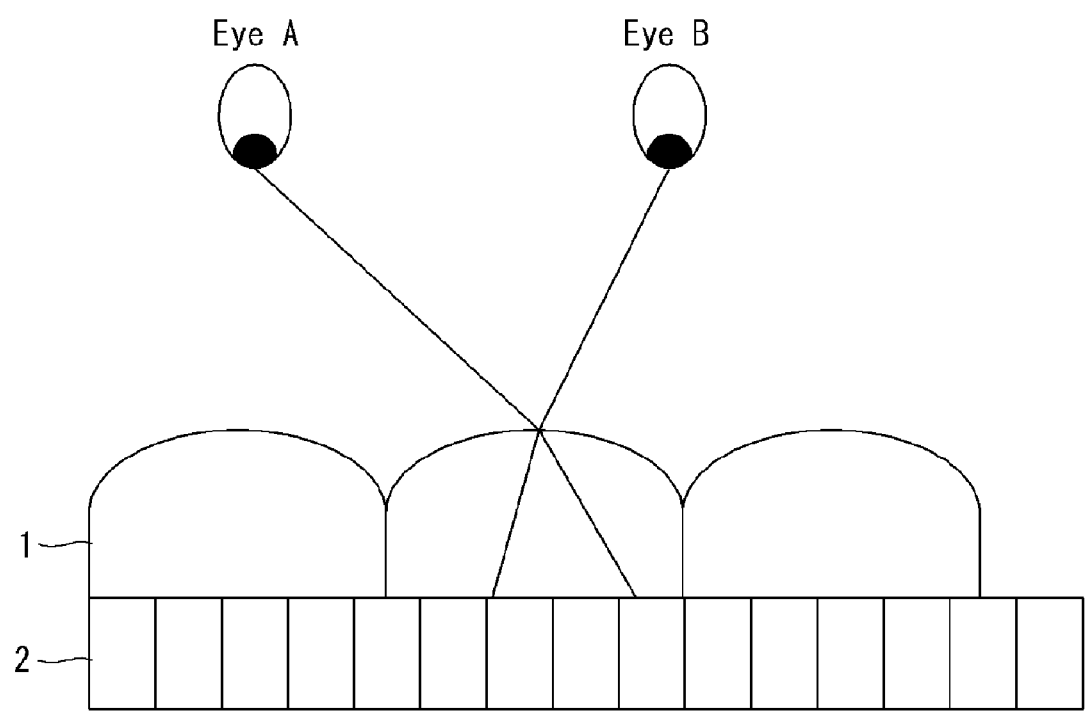
FIGS. 1 and 2 schematically illustrate a lenticular lens type 3D image display device.
Figure 2:
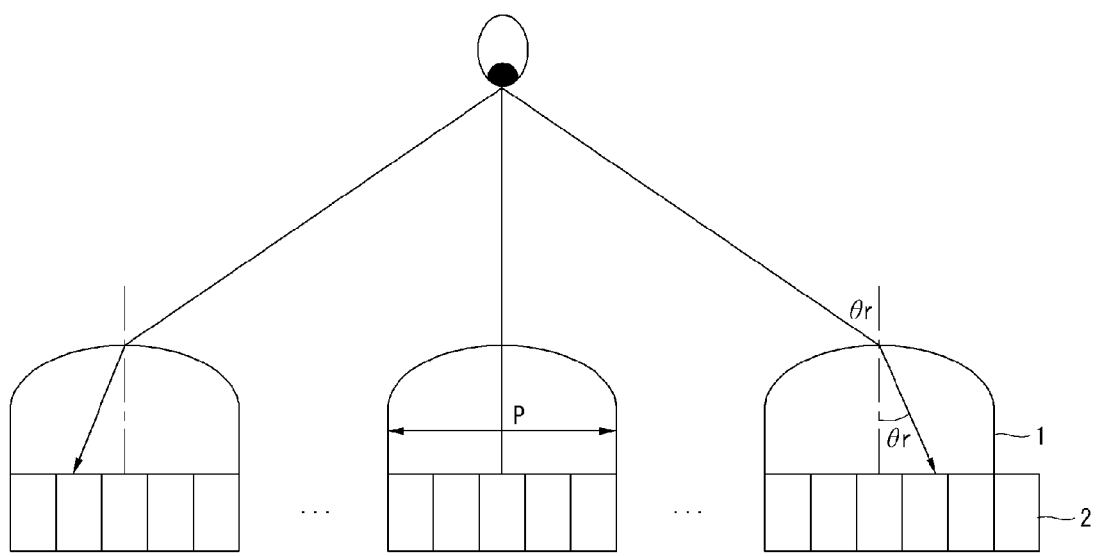
Figure 3:
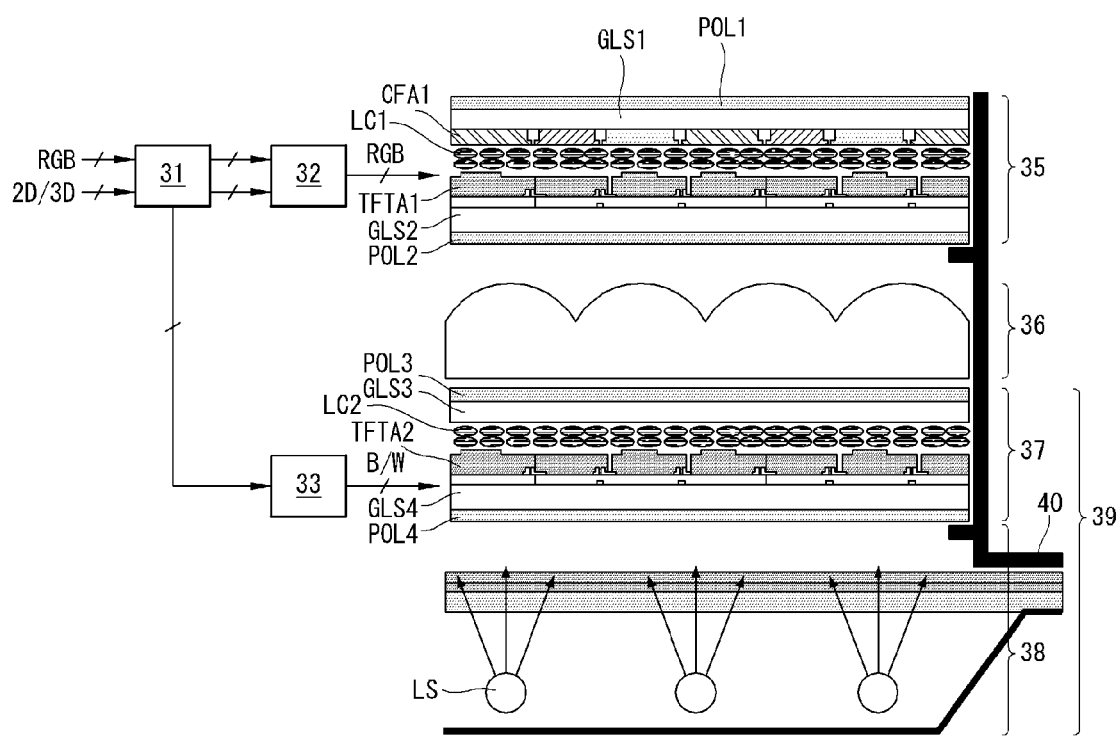
FIG. 3 is a block diagram showing an image display device according to a first exemplary embodiment of the invention.

As shown in FIG. 3, an image display device according to a first exemplary embodiment of the invention includes a lenticular lens array 36, an image display panel 35 on the lenticular lens array 36, and a light source module 39 under the lenticular lens array 36.

The lenticular lens array 36 includes a plurality of semi-cylindrical lenticular lenses formed opposite the image display panel 35.

The image display panel 35 may be implemented as a transmissive type display device, for example, a liquid crystal display. In case the liquid crystal display is used as the image display panel 35, the image display panel 35 includes an upper glass substrate GLS1, a lower glass substrate GLS2, and a liquid crystal layer LC1 between the upper and lower glass substrates GLS1 and GLS2. A thin film transistor (TFT) array TFTA1 is formed on the lower glass substrate GLS2. The TFT array TFTA1 includes a plurality of data lines receiving R, G, and B data voltages, a plurality of gate lines (i.e., scan lines) that cross the data lines to receive gate pulses (i.e., scan pulses), a plurality of thin film transistors (TFTs) formed at each of crossings of the data lines and the gate lines, a plurality of pixel electrodes for charging liquid crystal cells to a data voltage, a storage capacitor that is connected to the pixel electrodes to keep a voltage of the liquid crystal cells constant, and the like. A color filter array CFA1 is formed on the upper glass substrate GLS1. The color filter array CFA1 includes a black matrix, a color filter, and the like. A common electrode is formed on the upper glass substrate GLS1 in a vertical electric drive manner, such as a twisted nematic (TN) mode and a vertical alignment (VA) mode. The common electrode and the pixel electrode are formed on the lower glass substrate GLS2 in a horizontal electric drive manner, such as an in-plane switching (IPS) mode and a fringe field switching (FFS) mode. Polarizing plates POL1 and POL2 are attached respectively to the upper and lower glass substrates GLS1 and GLS2. Alignment layers for setting a pre-tilt angle of liquid crystals in an interface contacting the liquid crystals are respectively formed on the upper and lower glass substrates GLS1 and GLS2. A column space may be formed between the upper and lower glass substrates GLS1 and GLS2 to keep a cell gap of the liquid crystal cells constant.

The light source module 39 includes a backlight unit 38 and an active light splitting element 37 between the lenticular lens array 36 and the backlight unit 38.

The backlight unit 38 includes at least one light source LS and a plurality of optical members that convert light from the light source LS into light in the form of a surface light source to irradiate the light in the form of the surface light source onto the active light splitting element 37. The light source LS includes one or at least two of a hot cathode fluorescent lamp (HCFL), a cold cathode fluorescent lamp (CCFL), an external electrode fluorescent lamp (EEFL), and a light emitting diode (LED). The optical members include a light guide plate, a diffusion plate, a prism sheet, a diffusion sheet, and the like, and improve an uniformity of the light from the light source LS to irradiate the light having the improved uniformity onto the active light splitting element 37.

The active light splitting element 37 transmits light from the backlight unit 38 without a conversion of the light in a 2-dimensional (2D) mode through an electrical control. The active light splitting element 37 partially shields light from the backlight unit 38 in a 3-dimensional (3D) mode through an electrical control and spatially divides traveling paths of left-eye light and right-eye light that transmit the lenticular lens array 36 and respectively travel to a left eye and a right eye of an observer. For the above-described operation, the active light splitting element 37 includes a plurality of pixels arranged in a matrix format. The active light splitting element 37 is implemented as a backlit display element in which an optical path can open and close by electrically controlling subpixels and the pixels. For example, the active light splitting element 37 may be implemented as a liquid crystal display element not including a color filter array. In case as the liquid crystal display element is used as the active light splitting element 37, the active light splitting element 37 includes an upper glass substrate GLS3, a lower glass substrate GLS4, and a liquid crystal layer LC2 between the upper and lower glass substrates GLS3 and GLS4. A TFT array TFTA2 is formed on the lower glass substrate GLS4. The TFT array TFTA2 includes a plurality of data lines receiving a white gray level voltage and a black gray level voltage, a plurality of gate lines (i.e., scan lines) that cross the data lines to receive gate pulses (i.e., scan pulses), a plurality of TFTs formed at each of crossings of the data lines and the gate lines, a plurality of pixel electrodes for charging liquid crystal cells to a data voltage, a storage capacitor that is connected to the pixel electrodes to keep a voltage of the liquid crystal cells constant, and the like. A color filter array is not formed on the upper glass substrate GLS3. A common electrode is formed on the upper glass substrate GLS3 or the lower glass substrate GLS4. Polarizing plates POL3 and POL4 are attached respectively to the upper and lower glass substrates GLS3 and GLS4. Alignment layers for setting a pre-tilt angle of liquid crystals in an interface contacting the liquid crystals are respectively formed on the upper and lower glass substrates GLS3 and GLS4. A column space may be formed between the upper and lower glass substrates GLS3 and GLS4 to keep a cell gap of the liquid crystal cells constant.

The lenticular lens array 36 and the active light splitting element 37 uniformly irradiate light onto the image display panel 35 in the 2D mode and horizontally split light passing through the lenticular lens array 36 in the 3D mode. R, G, and B data voltages arranged in a 2D data format are supplied to the image display panel 35 in the 2D mode, and R, G, and B data voltages arranged in a 3D image data format are supplied to the image display panel 35 in the 3D mode. The image display panel 35 and the active light splitting element 37 are driven at a predetermined frame rate so that they synchronize with each other.

A frame 40 stably supports the image display panel 35, the lenticular lens array 36, the active light splitting element 37, and the backlight unit 38 and separates the above elements 35, 36, 37, and 38 at a proper distance from each other.

If the image display panel 35 and the active light splitting element 37 are driven at a frame frequency corresponding to a multiple of an integer of 60 Hz (i.e., at a frame frequency of N×60 Hz, where N is an integer equal or greater than 1), an N-view 3D image may be displayed.

The image display device according to the first exemplary embodiment of the invention includes a first driver 32 for driving the image display panel 35, a second driver 33 for driving the active light splitting element 37, and a controller 31.

The first driver 32 includes a data drive circuit for supplying the R, G, and B data voltages to the data lines of the image display panel 35 and a gate drive circuit for sequentially supplying the gate pulses to the gate lines of the image display panel 35. The data drive circuit of the first driver 32 converts RGB digital video data received from the controller 31 into an analog gamma voltage to generate the R, G, and B data voltages and supplies the R, G, and B data voltages to the data lines of the image display panel 35 under the control of the controller 31.

The second driver 33 includes a data drive circuit for supplying the white gray level voltage and the black gray level voltage to the data lines of the active light splitting element 37 and a gate drive circuit for sequentially supplying the gate pulses to the gate lines of the active light splitting element 37. The data drive circuit of the second driver 33 converts digital white data received from the controller 31 into a gamma voltage with a peak white gray level in the 2D mode to generate white gray level voltages and supplies the white gray level voltages to the data lines of the active light splitting element 37 under the control of the controller 31. The data drive circuit of the second driver 33 converts digital white data and digital black data received from the controller 31 into a gamma voltage with a peak white gray level and a gamma voltage with a peak black gray level in the 3D mode to generate white gray level voltages W and black gray level voltages B and supplies the white gray level voltages W and the black gray level voltages B to the data lines of the active light splitting element 37 under the control of the controller 31.

Figure 4:
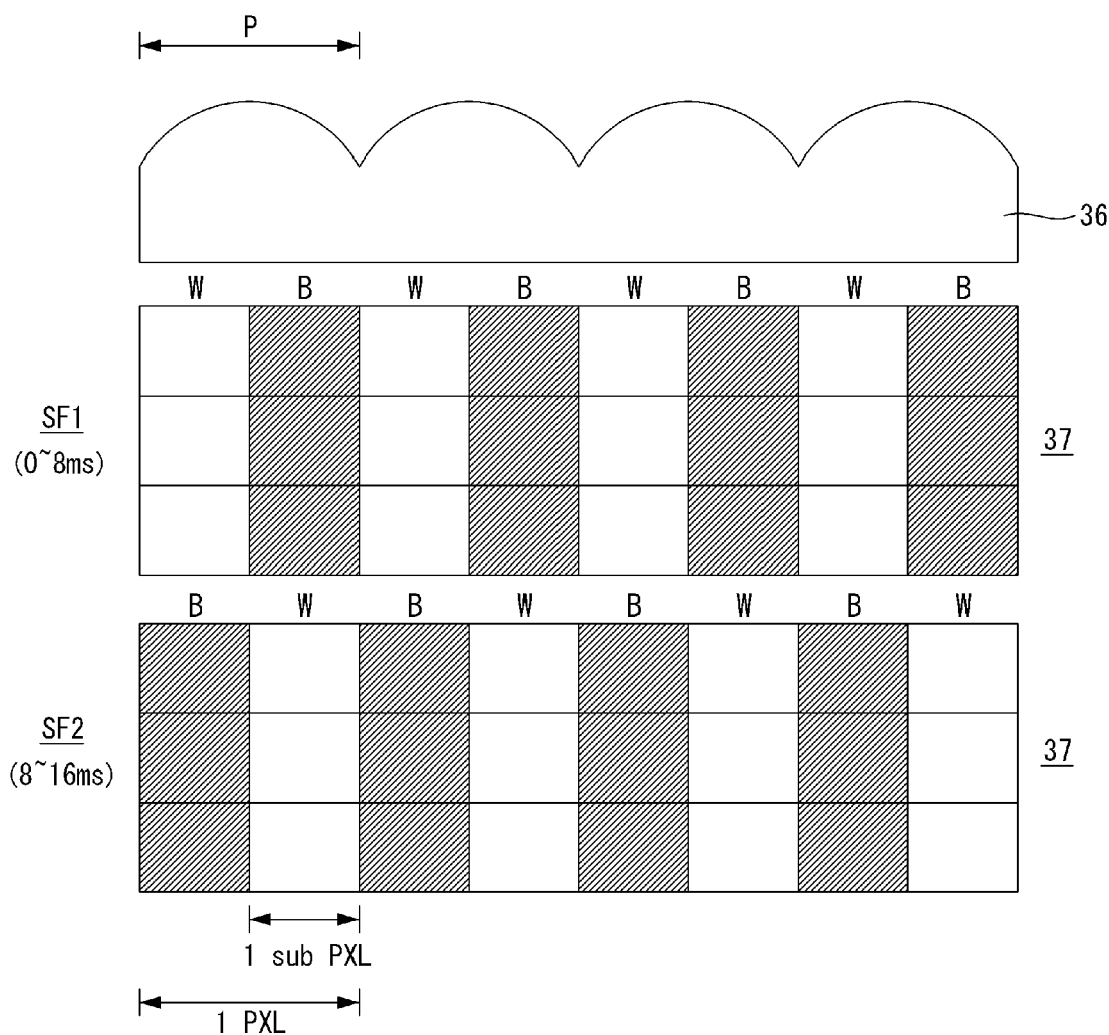
FIG. 4 illustrates a white pattern and a black pattern displayed on an active light splitting element when the image display device is driven at a frame frequency of 120 Hz.
Figure 5:
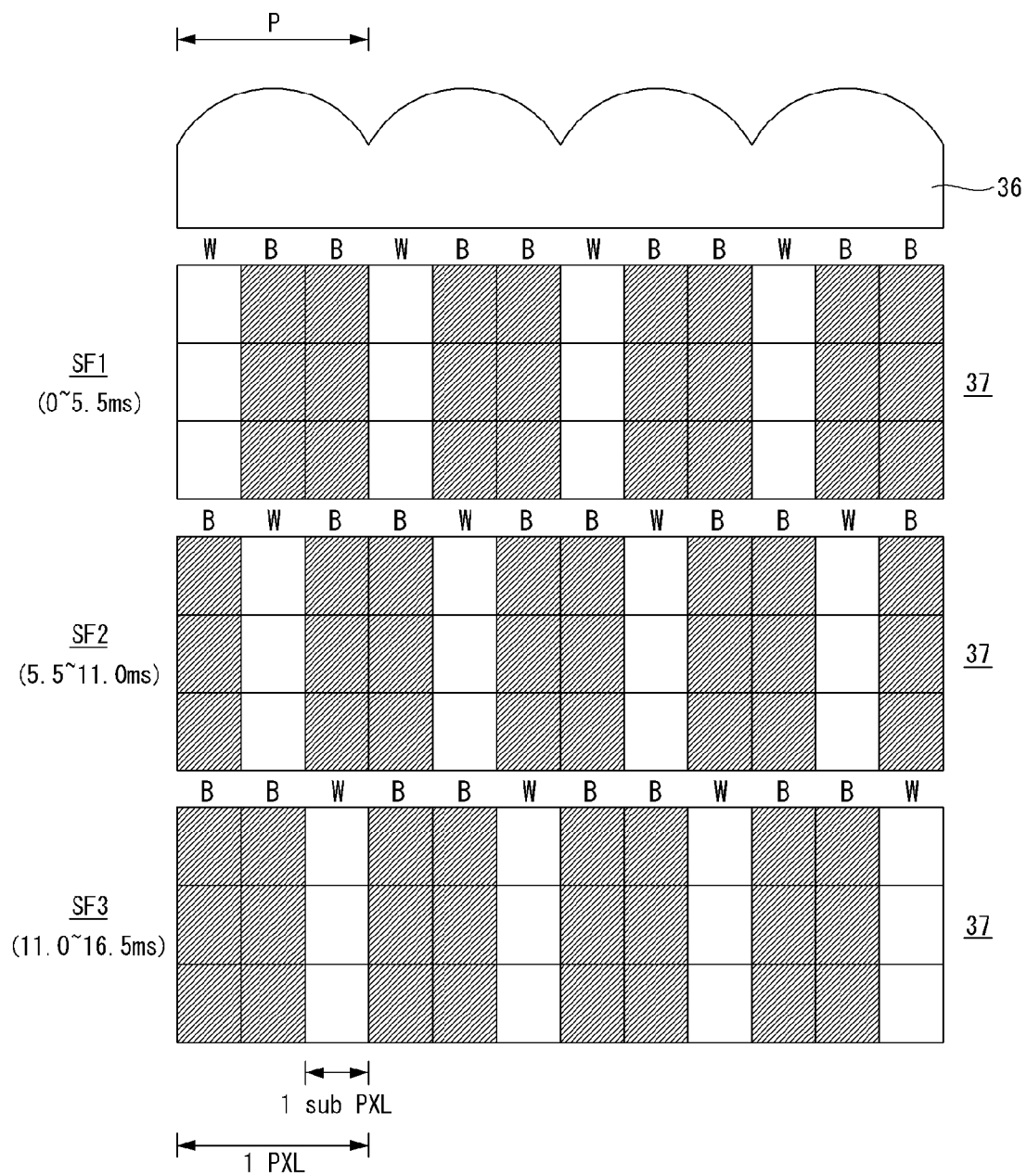
FIG. 5 illustrates a white pattern and a black pattern displayed on the active light splitting element when the image display device is driven at a frame frequency of 180 Hz.

The controller 31 controls the first and second drivers 32 and 33 so that the first and second drivers 32 and 33 operate in conformity with the 2D or 3D mode in response to a 2D or 3D mode selection signal a user inputs through a user interface or a 2D/3D identification code extracted from an input video signal. The controller 31 supplies the RGB digital video data to the data drive circuit of the first driver 32 and supplies the digital white data and the digital black data to the data drive circuit of the second driver 33. In the 2D mode, the controller 31 rearranges the RGB digital video data in the 2D data format and supplies the RGB digital video data of the 2D data format to the data drive circuit of the first driver 32. In the 2D mode, the controller 31 supplies the digital white data to the data drive circuit of the second driver 33. In the 3D mode, the controller 31 rearranges the RGB digital video data in the 3D data format and supplies the RGB digital video data of the 3D data format to the data drive circuit of the first driver 32. In the 3D mode, the controller 31 alternately supplies the digital white data and the digital black data to the data drive circuit of the second driver 33. In the 3D mode, the white gray level voltage and the black gray level voltage generated by the second driver 33 are supplied to the active light splitting element 37. Hence, as shown in FIGS. 4 to 6, a white pattern transmitting light and a black pattern shielding light alternately appear on the active light splitting element 37. Locations of the white pattern and the black pattern are reversed every 1 frame period/N. The liquid crystal cells of the active light splitting element 37 charged to the white gray level voltage transmit light at a maximum transmittance, and the liquid crystal cells of the active light splitting element 37 charged to the black gray level voltage shield light (i.e., are driven at a minimum transmittance).

The controller 31 receives timing signals, such as horizontal and vertical sync signals, a data enable signal, a dot clock signal to generate timing control signals for controlling operation timing of the first and second drivers 32 and 33. The controller 31 multiplies the timing control signals in a multiple of an integer and allows the first and second driver 32 and 33 to be driven at a frame frequency of N×60 Hz. In this case, the controller 31 rearranges the RGB video data supplied to the data drive circuit of the first driver 32 in conformity with a multi-view 3D format so that a multi-view 3D image is displayed in the 3D mode.

When the image display device shown in FIG. 3 is driven in the 3D mode, light passing through the lenticular lens array 36 is horizontally split at an optimum distance. As shown in FIGS. 4 to 6, 1 lens pitch P of the lenticular lens array 36 sets to be substantially equal to 1 pixel 1PXL of the active light splitting element 37 so as to display the multi-view 3D image. The optimum distance is a distance between the observer and the image display panel 35 at which the observer can clearly watch the 3D image displayed on the image display panel 35.

The number of subpixels included in 1 pixel 1PXL of the active light splitting element 37 varies depending on the frame frequency of the image display panel 35 and the active light splitting element 37. If the image display panel 35 and the active light splitting element 37 are driven at a frame frequency of 60 Hz×N, 1 pixel 1PXL of the active light splitting element 37 includes N subpixels in the 3D mode.

As shown in FIG. 4, if the image display panel 35 and the active light splitting element 37 are driven at a frame frequency of 120 Hz (=60 Hz×2), 1 pixel 1PXL of the active light splitting element 37 includes a first subpixel positioned at left side of 1 pixel and a second subpixel positioned at right side of 1 pixel in the 3D mode. If the image display panel 35 and the active light splitting element 37 are driven at a frame frequency of 120 Hz, the image display panel 35 and the active light splitting element 37 are time-division driven during first and second sub-frame periods SF1 and SF2 of 1 frame period (i.e., 1/60 sec or 0-16.67 ms). More specifically, in the 3D mode, the first subpixel is charged to the white gray level voltage during the first sub-frame period SF1 (i.e., 0-8 ms) and then is charged to the black gray level voltage during the second sub-frame period SF2 (i.e., 8-16 ms). The second subpixel is charged to the black gray level voltage during the first sub-frame period SF1 (0-8 ms) and then is charged to the white gray level voltage during the second sub-frame period SF2 (8-16 ms). In the 2D mode, the first and second subpixels are continuously charged to the white gray level voltage during 1 frame period (0-16.67 ms).

As shown in FIG. 5, if the image display panel 35 and the active light splitting element 37 are driven at a frame frequency of 180 Hz (=60 Hz×3), 1 pixel 1PXL of the active light splitting element 37 includes first to third subpixels from left side of 1 pixel in the 3D mode. If the image display panel 35 and the active light splitting element 37 are driven at a frame frequency of 180 Hz, the image display panel 35 and the active light splitting element 37 are time-division driven during first to third sub-frame periods SF1 to SF3 of 1 frame period (0-16.67 ms). More specifically, in the 3D mode, the first subpixel is charged to the white gray level voltage during the first sub-frame period SF1 (i.e., 0-5.5 ms) and is charged to the black gray level voltage during the second and third sub-frame periods SF2 and SF3 (i.e., 5.5-16.5 ms). The second subpixel is charged to the black gray level voltage during the first and third sub-frame periods SF1 and SF3 (i.e., 0-5.5 ms and 11.0-16.5 ms) and is charged to the white gray level voltage during the second sub-frame period SF2 (i.e., 5.5-11.0 ms). The third subpixel is charged to the black gray level voltage during the first and second sub-frame periods SF1 and SF2 (i.e., 0-11.0 ms) and is charged to the white gray level voltage during the third sub-frame period SF3 (i.e., 11.0-16.5 ms). In the 2D mode, the first to third subpixels are continuously charged to the white gray level voltage during 1 frame period (0-16.67 ms).

As shown in FIG. 6, if the image display panel 35 and the active light splitting element 37 are driven at a frame frequency of 240 Hz (=60 Hz×4), 1 pixel 1PXL of the active light splitting element 37 includes first to fourth subpixels from left side of 1 pixel in the 3D mode. If the image display panel 35 and the active light splitting element 37 are driven at a frame frequency of 240 Hz, the image display panel 35 and the active light splitting element 37 are time-division driven during first to fourth sub-frame periods SF1 to SF4 of 1 frame period (0-16.67 ms). More specifically, in the 3D mode, the first subpixel is charged to the white gray level voltage during the first sub-frame period SF1 (i.e., 0-4.1 ms) and is charged to the black gray level voltage during the second to fourth sub-frame periods SF2 to SF4 (i.e., 4.1-16.4 ms). The second subpixel is charged to the black gray level voltage during the first, third, and fourth sub-frame periods SF1, SF3, and SF4 (i.e., 0-4.1 ms and 8.2-16.4 ms) and is charged to the white gray level voltage during the second sub-frame period SF2 (i.e., 4.1-8.2 ms). The third subpixel is charged to the black gray level voltage during the first, second, and fourth sub-frame periods SF1, SF2, and SF4 (i.e., 0-8.2 ms and 12.3-16.4 ms) and is charged to the white gray level voltage during the third sub-frame period SF3 (i.e., 8.2-12.3 ms). The fourth subpixel is charged to the black gray level voltage during the first to third sub-frame periods SF1 to SF3 (i.e., 0-12.3 ms) and is charged to the white gray level voltage during the fourth sub-frame period SF4 (i.e., 12.3-16.4 ms). In the 2D mode, the first to fourth subpixels are continuously charged to the white gray level voltage during 1 frame period (0-16.67 ms).

Inventors performed an experiment to confirm whether light passing through the lenticular lens array 36 is spatially splitted or not. Inventors confirmed the experimental result that light transmitted by the lenticular lens array 36 is horizontally split at an optimum position due to the lenticular lens array 36 and the active light splitting element 37. The optimum position is the observer's position at the optimum distance from the image display panel 35. If the white and black patterns displayed on the active light splitting element 37 change, a path of light horizontally split at the optimum position changes. If the observer at the optimum position watches the white and black patterns of the active light splitting element 37 and an image displayed on the image display panel 35 in the 3D mode, pixels of the image the observer perceives through his or her left eye are different from pixels of the image the observer perceives through his/her right eye. Accordingly, the observer can feel a stereoscopic feeling.

FIGS. 7A to 12D illustrate changes in an optical path in the 2D and 3D modes when the image display device is driven at a frame frequency of 120 Hz, 180 Hz, and 240 Hz.

Figure 7A:
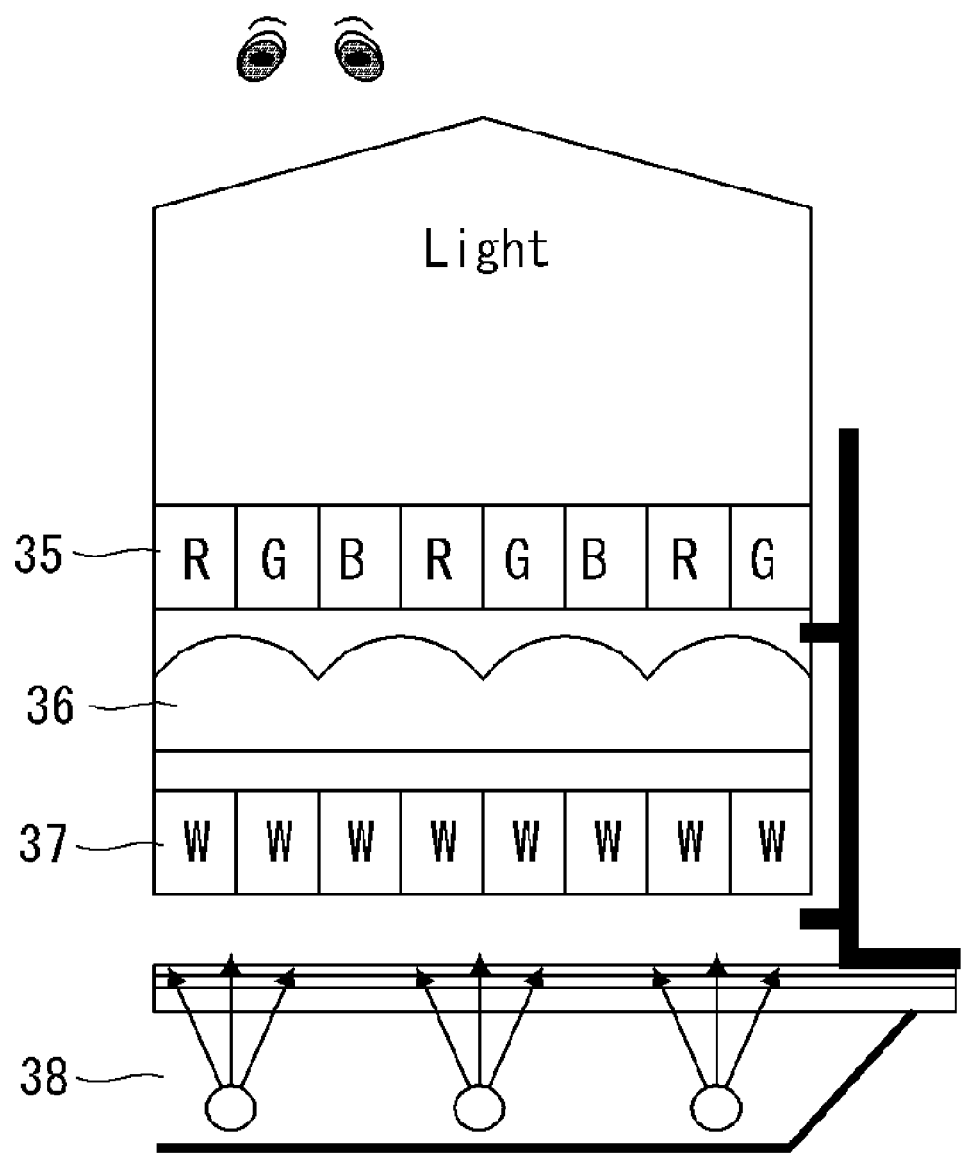
FIGS. 7A and 7B illustrate an optical path when the image display device is driven at a frame frequency of 120 Hz in a 2D mode during 1 frame period that is time-divided into first and second sub-frame periods.
Figure 7B:
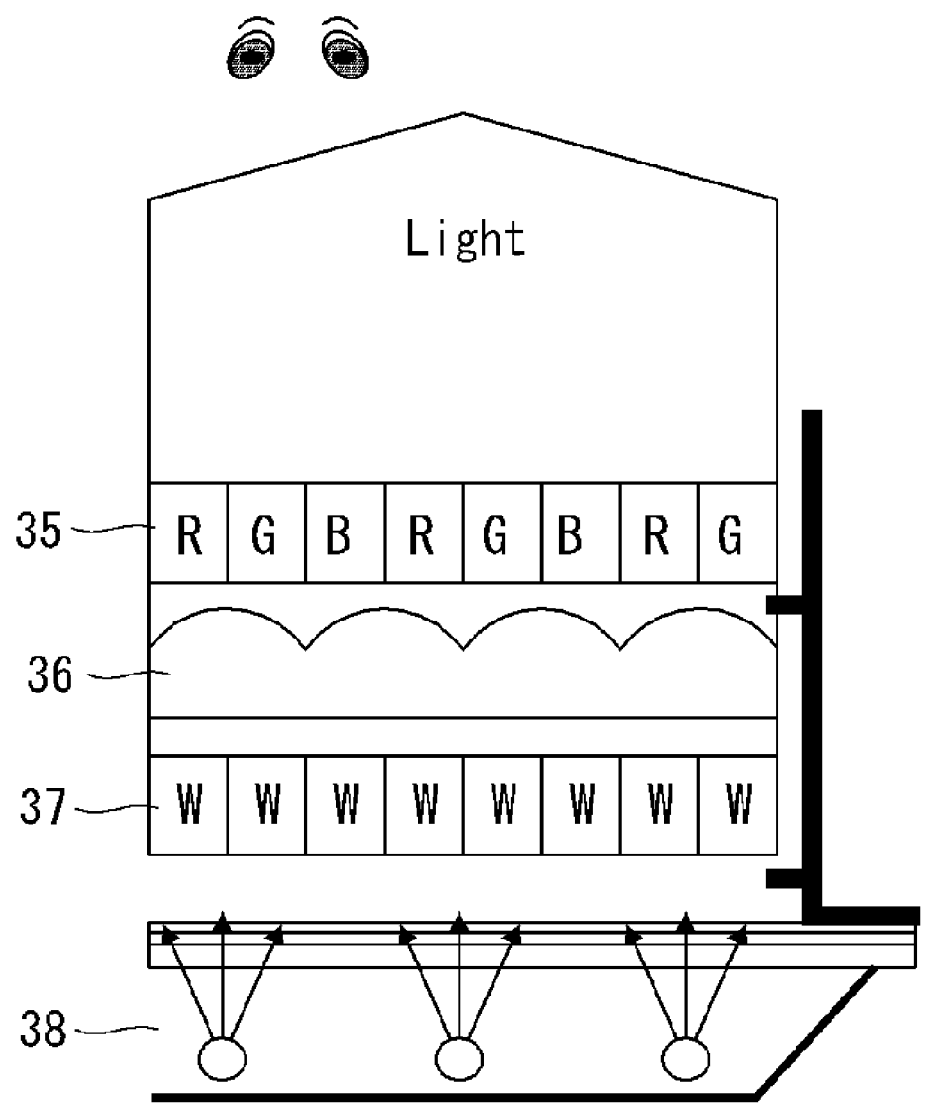

FIGS. 7A and 7B illustrate an optical path when the image display device is driven at a frame frequency of 120 Hz in the 2D mode during 1 frame period that is time-divided into first and second sub-frame periods SF1 and SF2.

As shown in FIGS. 7A and 7B, when the image display device is driven at a frame frequency of 120 Hz in the 2D mode, video signals of a 2D mode format are displayed on the image display panel 35 and the white gray level voltage is supplied to all the subpixels of the active light splitting element 37. Accordingly, the active light splitting element 37 transmits light from the backlight unit 38 without a conversion of the light. In the 2D mode, because the active light splitting element 37 does not split light from the light source, the same pixels are displayed on the image display panel 35 during the first and second sub-frame periods SF1 and SF2. Hence, the image display device displays a 2D image.

Figure 8A:
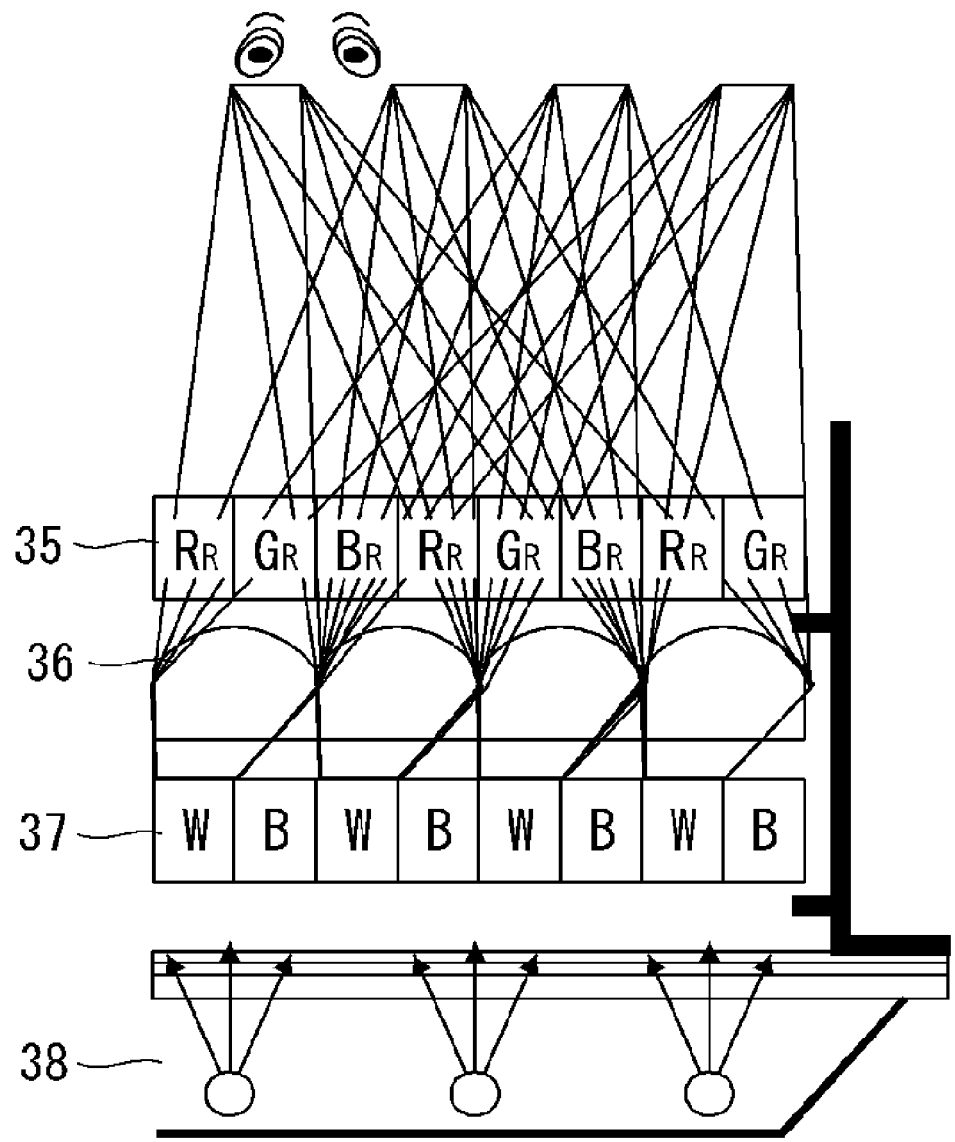
FIGS. 8A and 8B illustrate an optical path when the image display device is driven at a frame frequency of 120 Hz in a 3D mode during 1 frame period that is time-divided into first and second sub-frame periods.
Figure 8B:
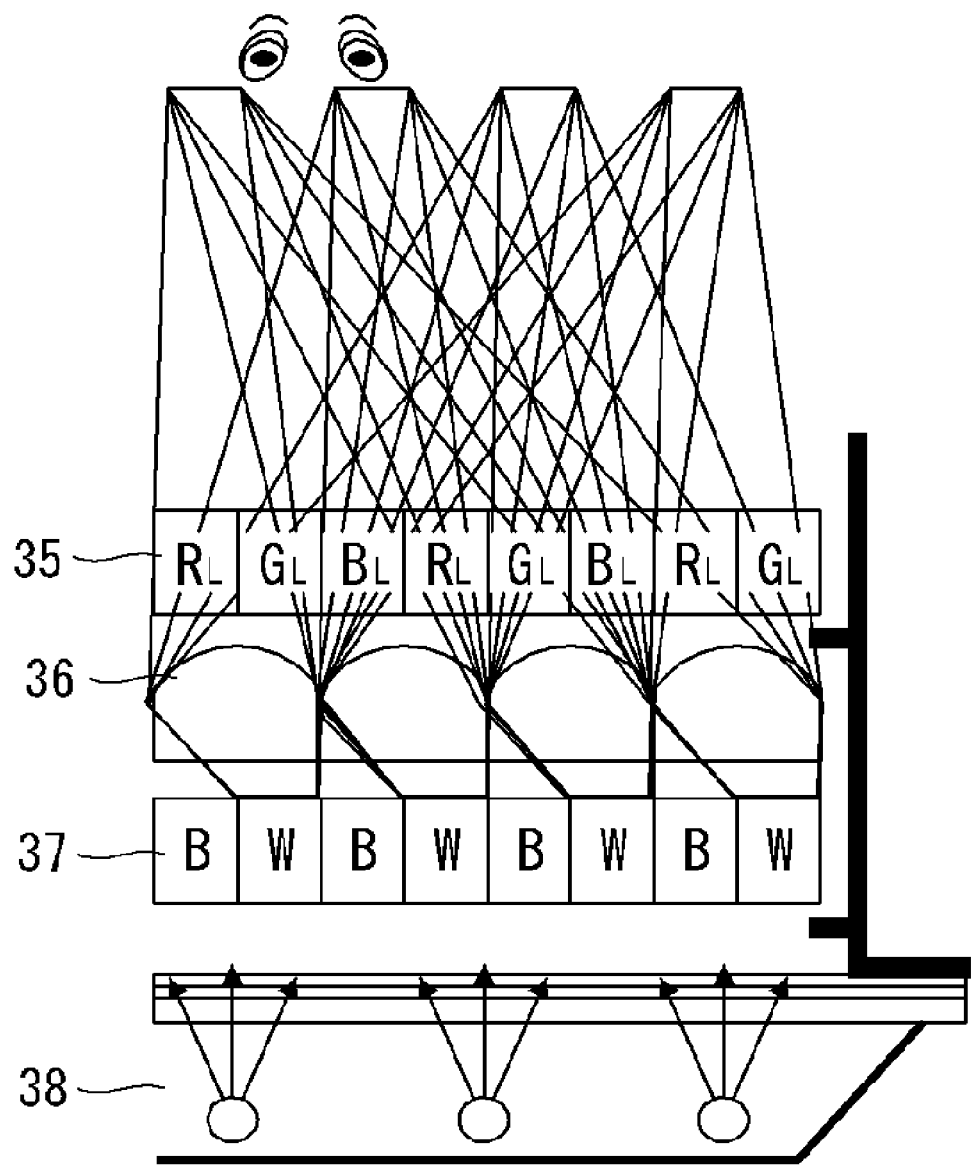
Figure 11A:
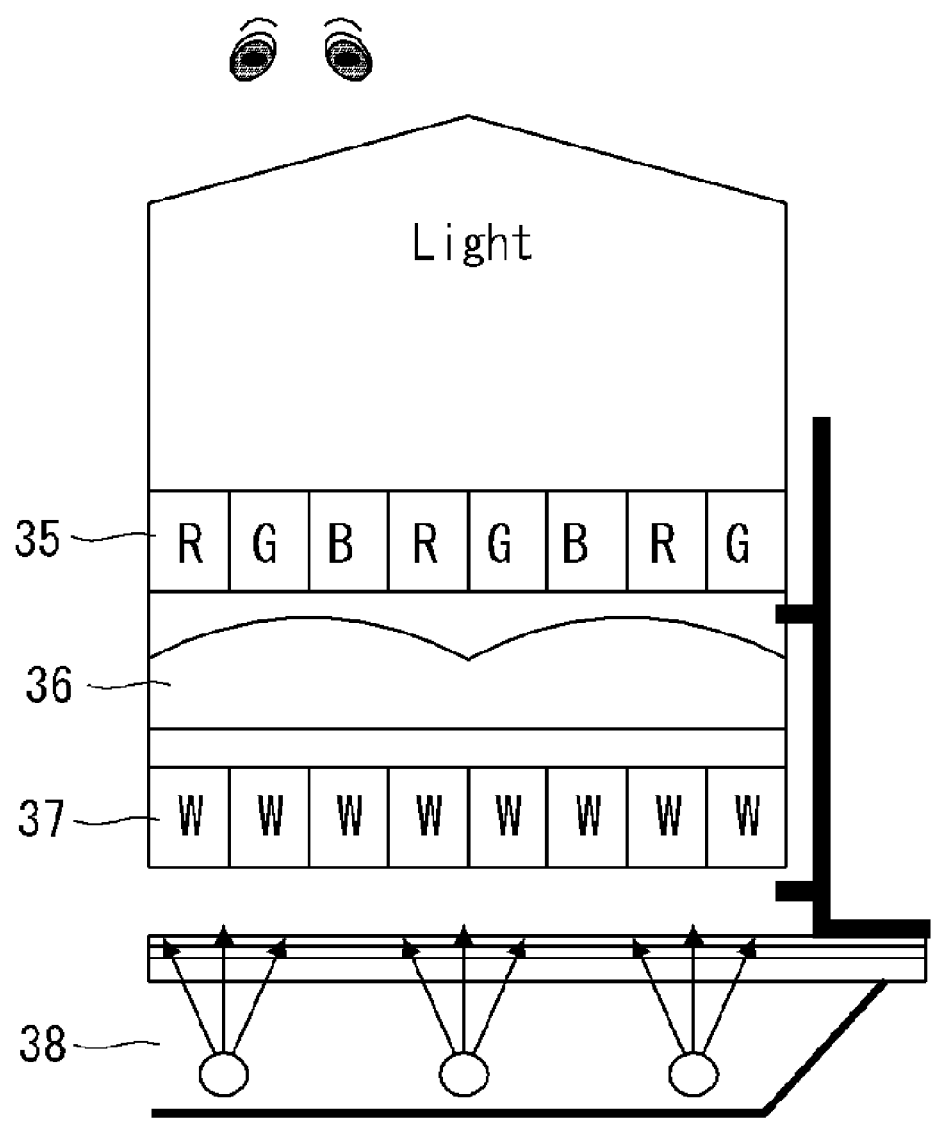
FIGS. 11A to 11D illustrate an optical path when the image display device is driven at a frame frequency of 240 Hz in a 2D mode during 1 frame period that is time-divided into first to fourth sub-frame periods.
Figure 11B:
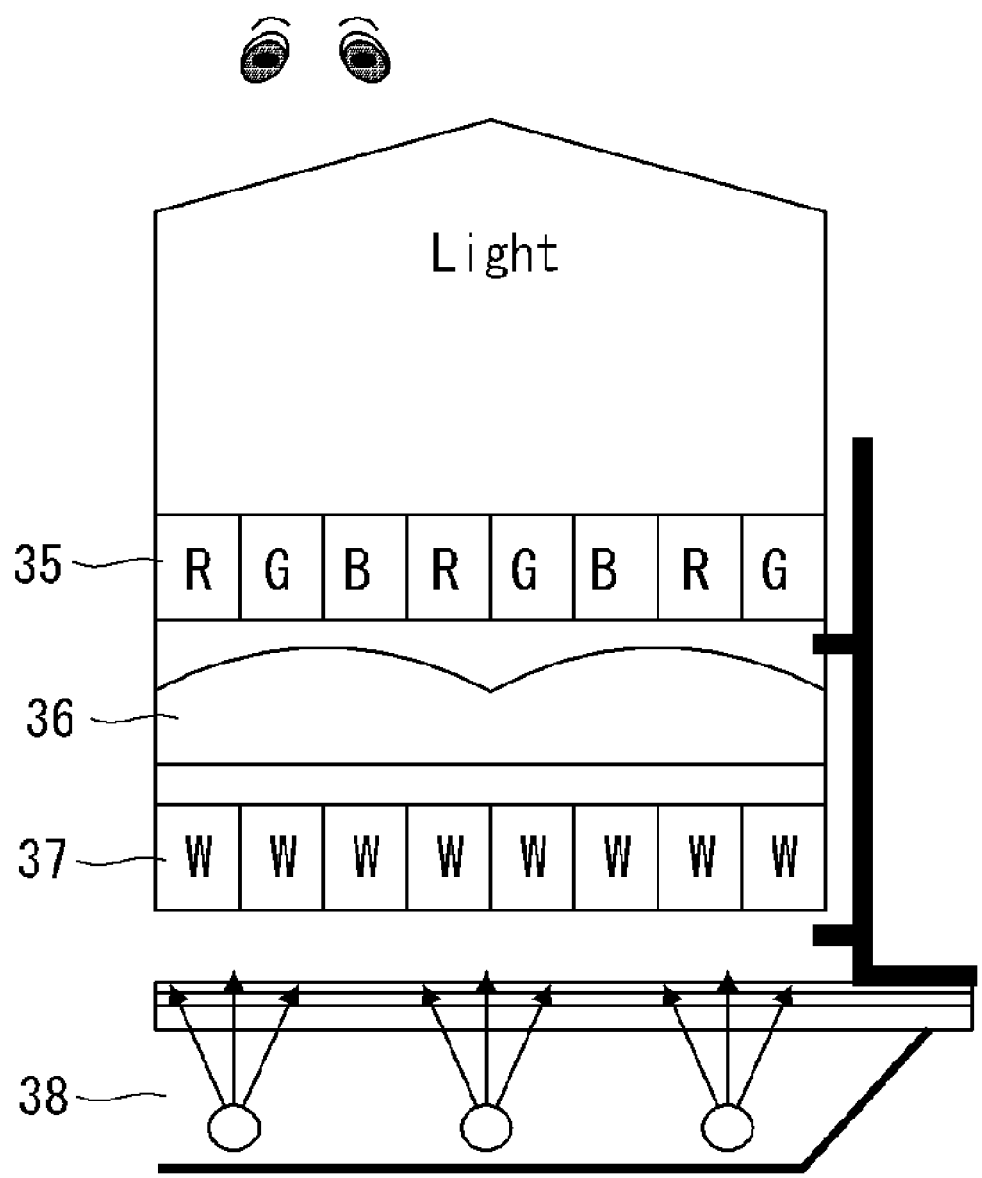
Figure 11C:
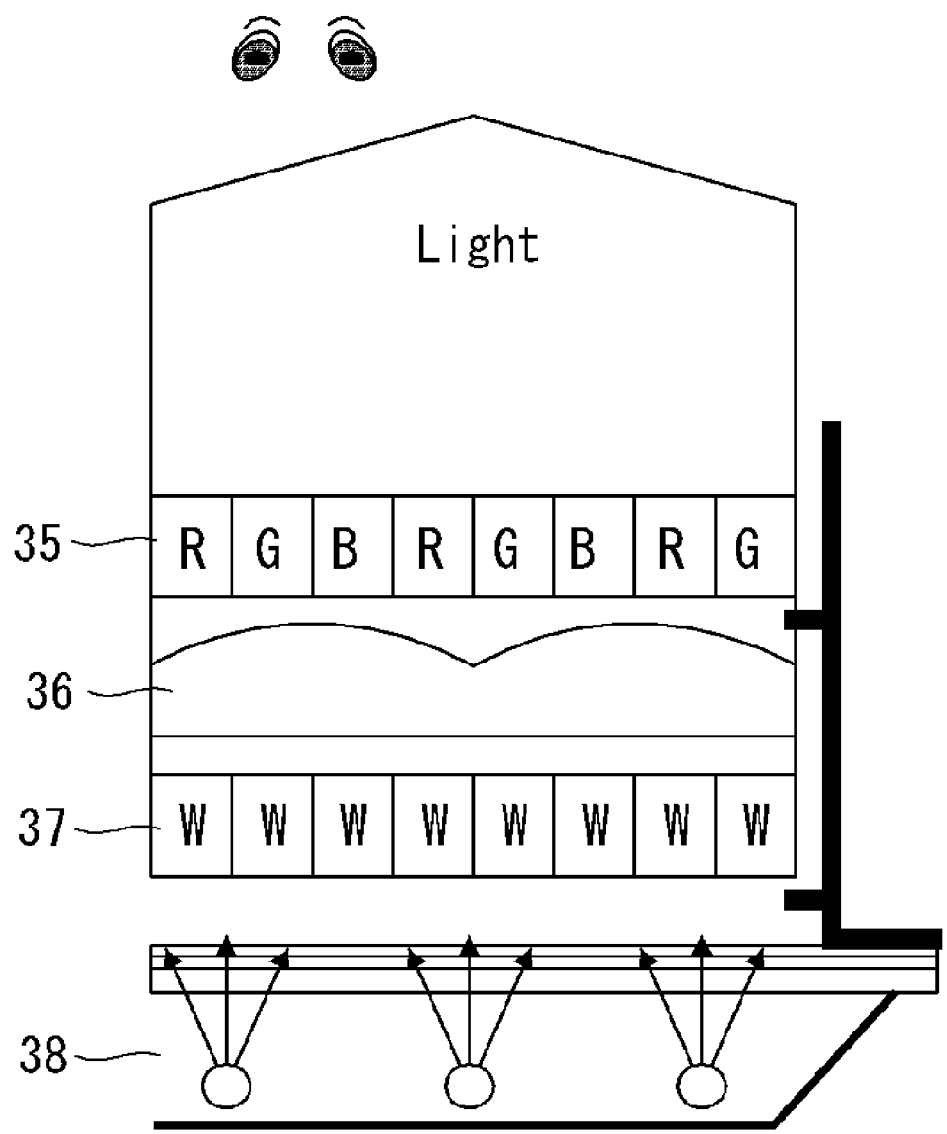
Figure 11D:
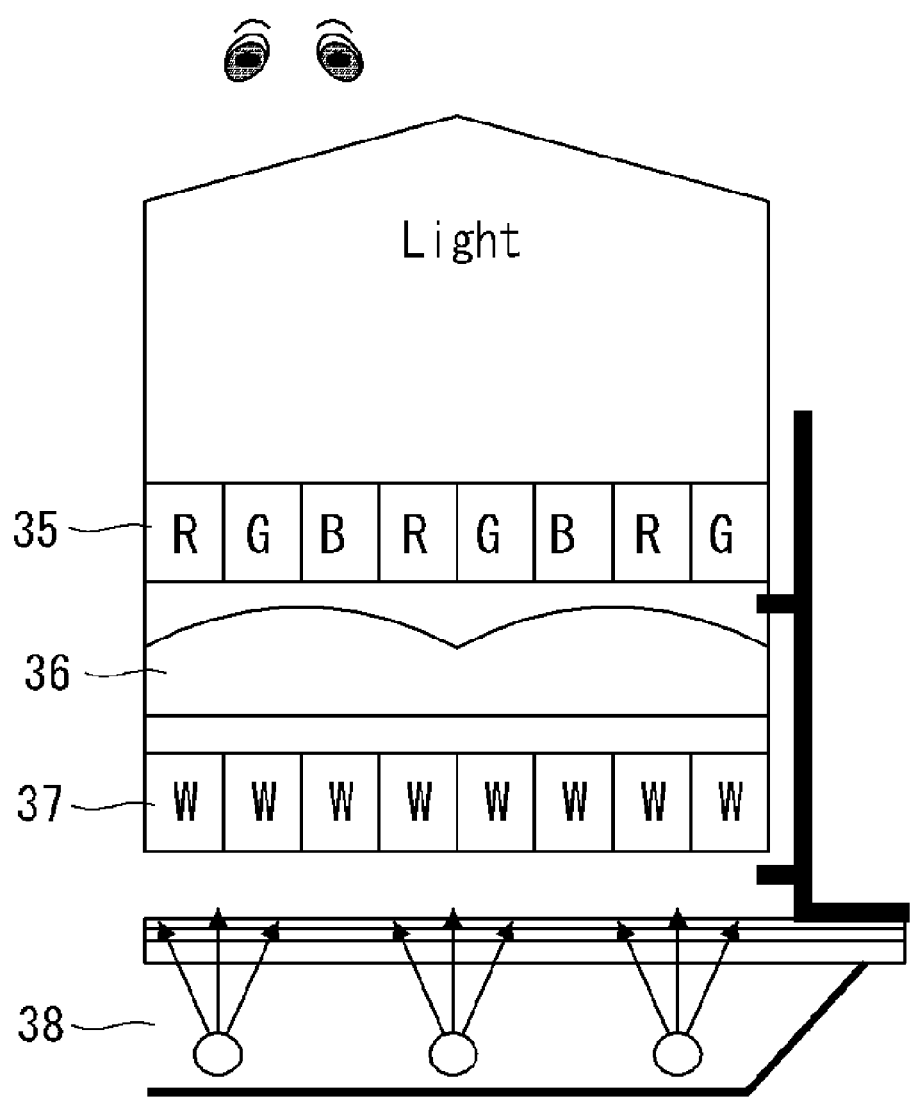

FIGS. 8A and 8B illustrate an optical path when the image display device is driven at a frame frequency of 120 Hz in the 3D mode during 1 frame period that is time-divided into first and second sub-frame periods SF1 and SF2. As shown in FIGS. 11A and 11B, the image display panel 35 displays a 3D image of 2-view format in which a right eye image RRGRBR and a left eye image $R_L G_L B_L$ are time-divided.

During the first sub-frame period SF1 (i.e., 0-8 ms), as shown in FIG. 4, the first subpixels of the active light splitting element 37 are charged to the white gray level voltage, and the second subpixels of the active light splitting element 37 are charged to the black gray level voltage. As a result, light from the light source is spatially split by the active light splitting element 37. The lenticular lens array 36 refracts light coming from the first subpixels as shown in FIG. 8A. During the first sub-frame period SF1 (0-8 ms), the observer at the optimum position may watch the pixels of the image display panel 35, on which the right eye image RRGRBR is displayed, through his/her left eye.

During the second sub-frame period SF2 (i.e., 8-16 ms), as shown in FIG. 4, the first subpixels of the active light splitting element 37 are charged to the black gray level voltage, and the second subpixels of the active light splitting element 37 are charged to the white gray level voltage. As a result, light from the light source is spatially split by the active light splitting element 37. The lenticular lens array 36 refracts light coming from the second subpixels as shown in FIG. 11B. During the second sub-frame period SF2 (8-16 ms), the observer at the optimum position may watch the pixels of the image display panel 35, on which the left eye image $R_L G_L B_L$ is displayed, through his/her right eye.

Accordingly, as shown in FIGS. 8A and 8B, the image display device spatially splits light of the right eye image traveling to his/her left eye and light of the left eye image traveling to his/her right eye and also time-division displays the left eye image and the right eye image. Hence, the observer may feel a stereoscopic feeling of the 3D image during 1 frame period through a stereoscopic technique.

Figure 9A:
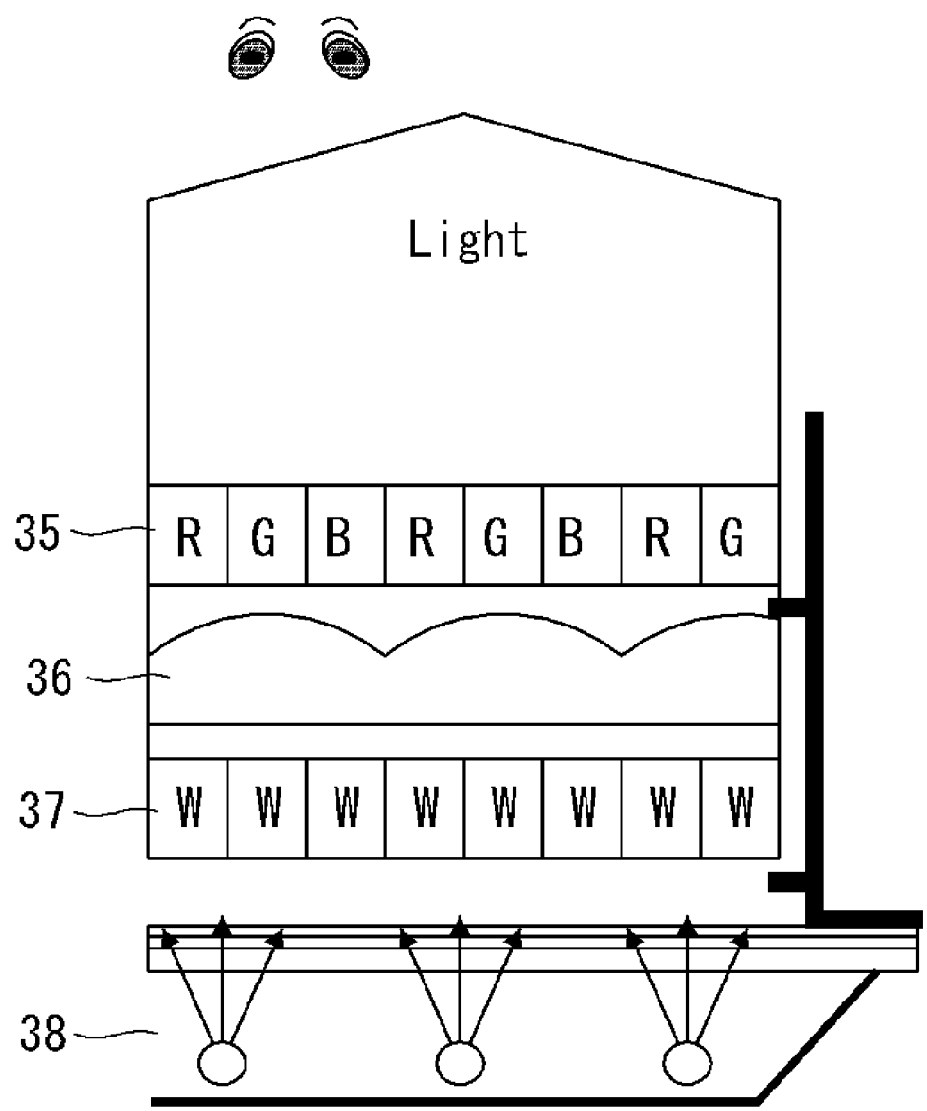
FIGS. 9A to 9C illustrate an optical path when the image display device is driven at a frame frequency of 180 Hz in a 2D mode during 1 frame period that is time-divided into first to third sub-frame periods.

FIGS. 9A to 92C illustrate an optical path when the image display device is driven at a frame frequency of 180 Hz in the 2D mode during 1 frame period that is time-divided into first to third sub-frame periods SF1 to SF3.

Figure 9B:
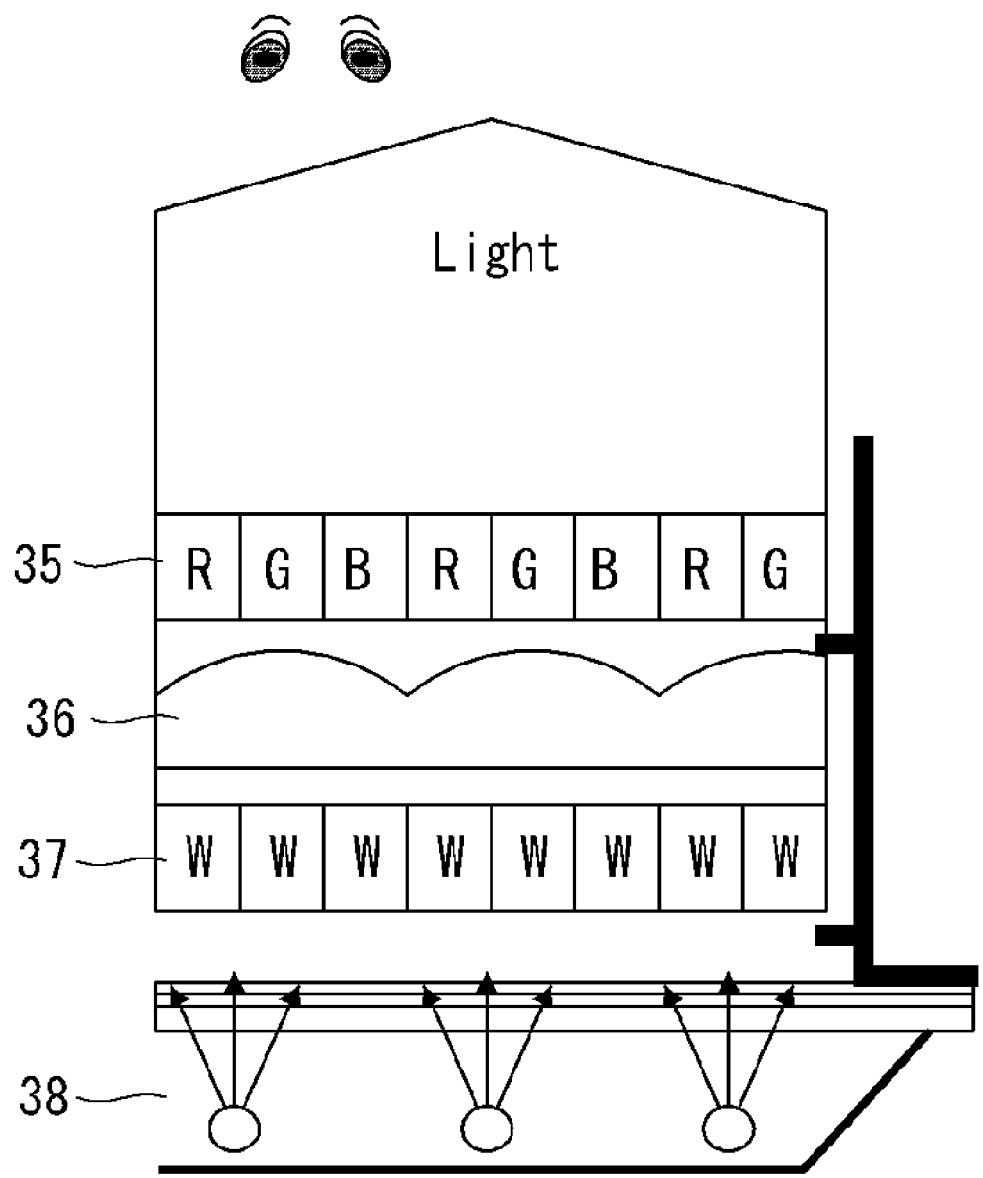
Figure 9C:
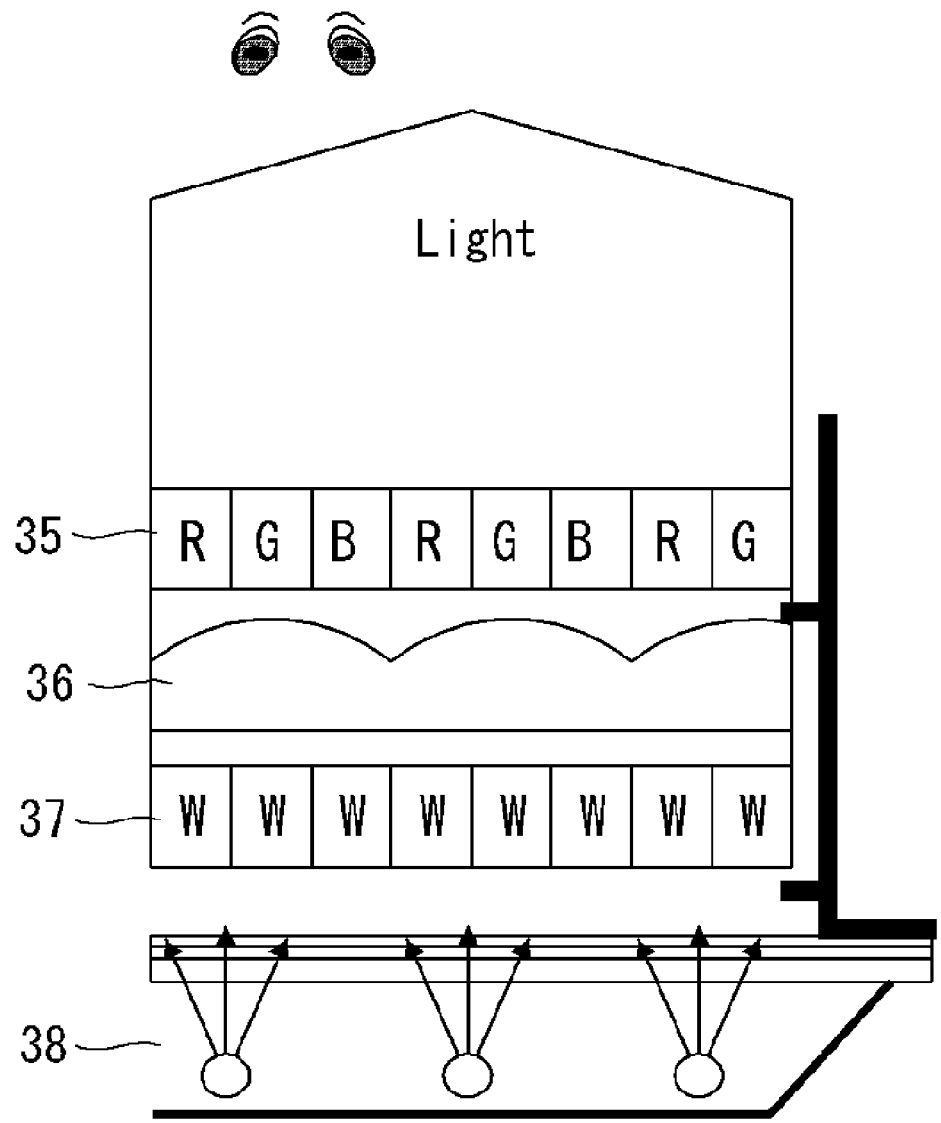

As shown in FIGS. 9A to 9C, when the image display device is driven at a frame frequency of 180 Hz in the 2D mode, video signals of a 2D mode format are displayed on the image display panel 35 and the white gray level voltage is supplied to all the subpixels of the active light splitting element 37. Accordingly, the active light splitting element 37 transmits light from the backlight unit 38 without a conversion of the light. In the 2D mode, because the active light splitting element 37 does not split light from the light source, the same pixels are displayed on the image display panel 35 during the first to third sub-frame periods SF1 to SF3. Hence, the image display device displays a 2D image.

Figure 10A:
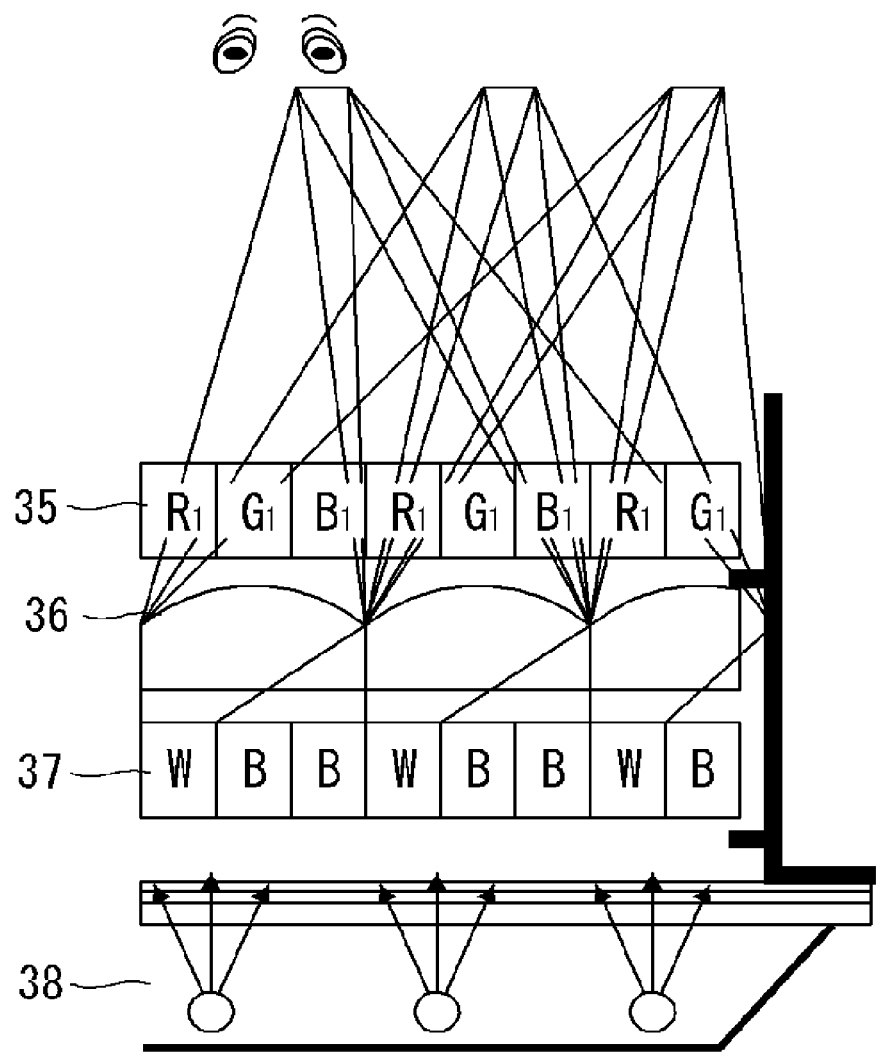
FIGS. 10A to 10C illustrate an optical path when the image display device is driven at a frame frequency of 180 Hz in a 3D mode during 1 frame period that is time-divided into first to third sub-frame periods.
Figure 10B:
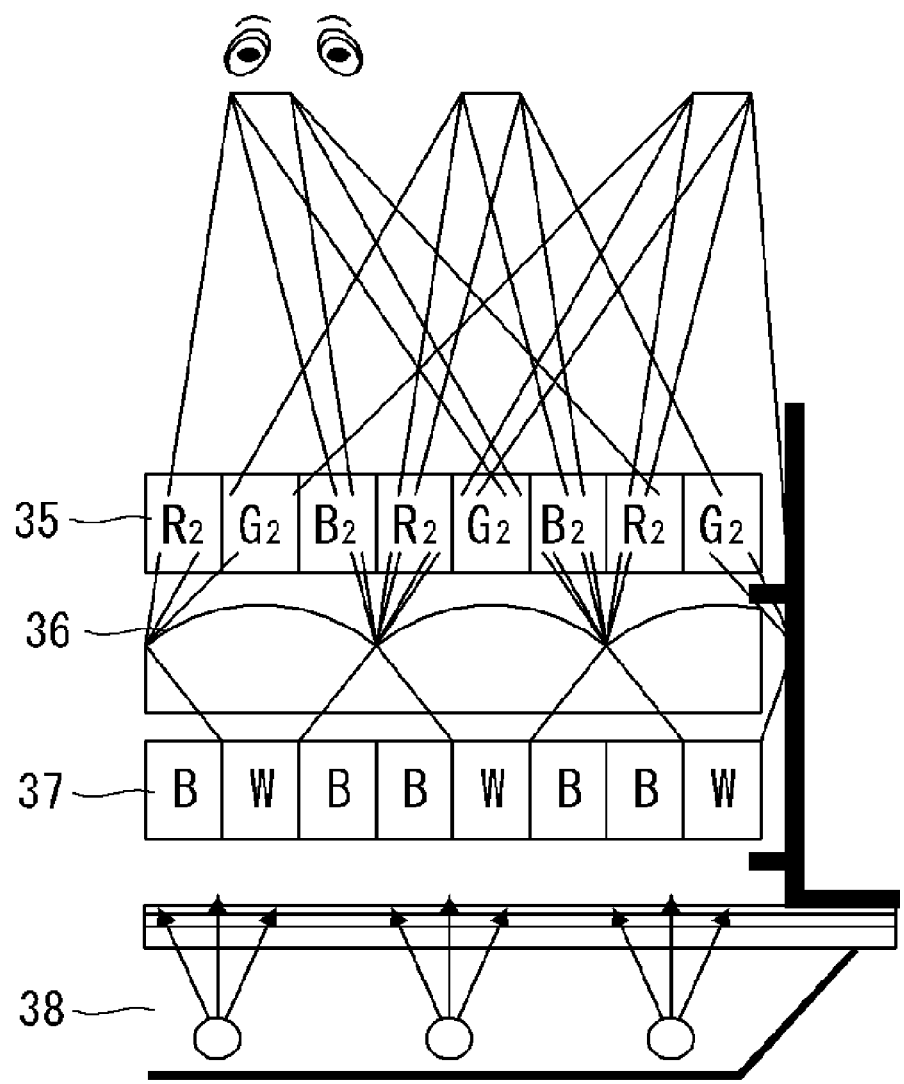
Figure 10C:
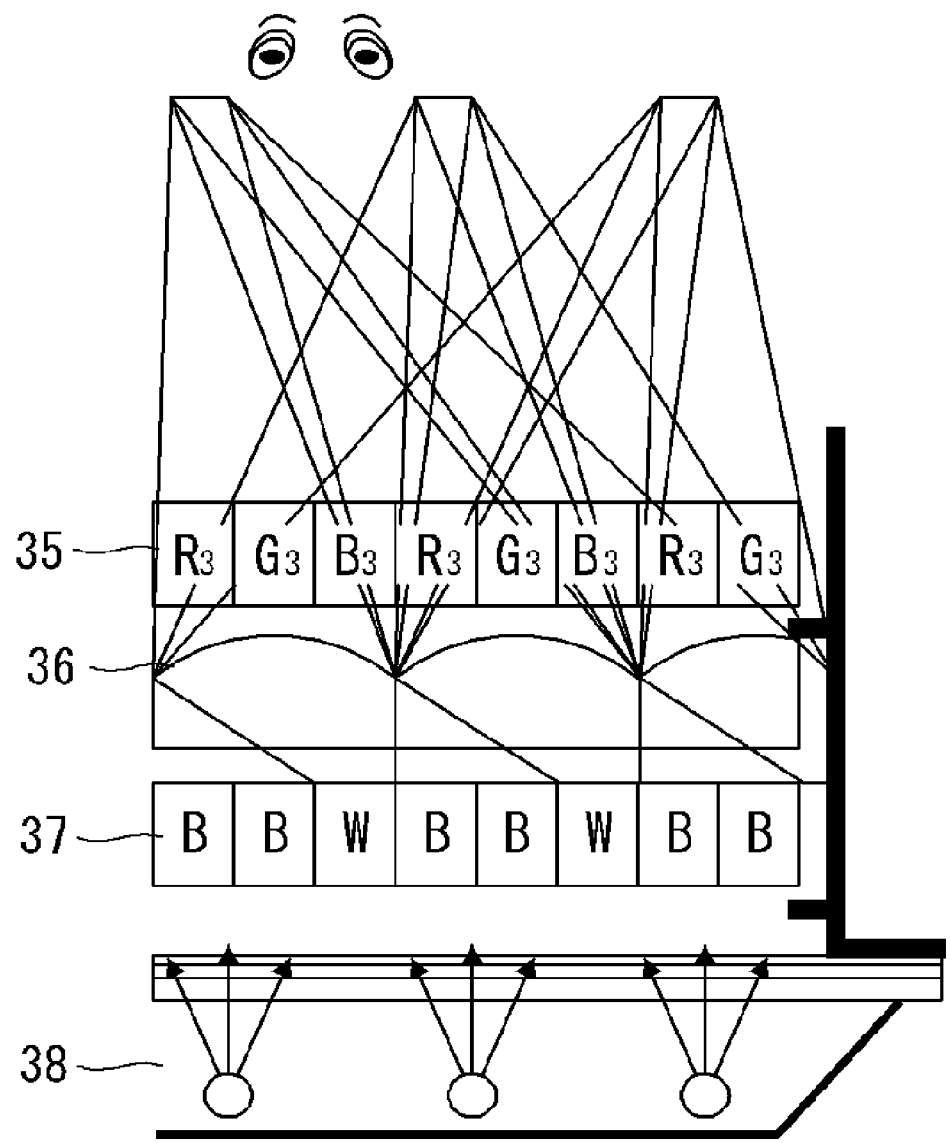

FIGS. 10A to 10C illustrate an optical path when the image display device is driven at a frame frequency of 180 Hz in the 3D mode during 1 frame period that is time-divided into first to third sub-frame periods SF1 to SF3. The image display panel 35 sequentially displays a first image $R_1G_1B_1$ of a first view, a second image $R_2G_2B_2$ of a second view, and a third image $R_3G_3B_3$ of a third view, that show an object of an 3D image at different angles depending on viewing position of the observer at the optimum position. Hence, the image display panel 35 displays a multi-view 3D image.

During the first sub-frame period SF1 (i.e., 0-5.5 ms), as shown in FIG. 5, the first subpixels of the active light splitting element 37 are charged to the white gray level voltage, and the second and third subpixels of the active light splitting element 37 are charged to the black gray level voltage. As a result, light from the light source is spatially split by the active light splitting element 37. The pixels of the image display panel 35 display the first image $R_1G_1B_1$ during the first sub-frame period SF1 (0-5.5 ms). The lenticular lens array 36 refracts light coming from the first subpixels as shown in FIG. 10A. During the first sub-frame period SF1 (0-5.5 ms), the observer at the optimum position may watch the pixels of the image display panel 35, on which the first image $R_1G_1B_1$ is displayed, through his/her right eye.

During the second sub-frame period SF2 (i.e., 5.5-11.0 ms), as shown in FIG. 5, the first and third subpixels of the active light splitting element 37 are charged to the black gray level voltage, and the second subpixels of the active light splitting element 37 are charged to the white gray level voltage. As a result, light from the light source is spatially split by the active light splitting element 37. The pixels of the image display panel 35 display the second image $R_2G_2B_2$ during the second sub-frame period SF2 (5.5-11.0 ms). The lenticular lens array 36 refracts light coming from the second subpixels as shown in FIG. 10B. During the second sub-frame period SF2 (5.5-11.0 ms), the observer at the optimum position may watch the pixels of the image display panel 35, on which the second image $R_2G_2B_2$ is displayed, through his/her left eye. Hence, the observer can feel the stereoscopic feeling of the 3D image during the first and second sub-frame periods SF1 and SF2 through the stereoscopic technique.

During the third sub-frame period SF3 (i.e., 11.0-16.5 ms), as shown in FIG. 5, the first and second subpixels of the active light splitting element 37 are charged to the black gray level voltage, and the third subpixels of the active light splitting element 37 are charged to the white gray level voltage. As a result, light from the light source is spatially split by the active light splitting element 37. The pixels of the image display panel 35 display the third image $R_3G_3B_3$ during the third sub-frame period SF3 (11.0-16.5 ms). The lenticular lens array 36 refracts light coming from the third subpixels as shown in FIG. 10C.

As shown in FIGS. 10A to 10C, the 3-view 3D image can be displayed by driving the image display device according to the embodiment of the invention at the frame frequency of 180 Hz in the 3D mode. A drive of the image display device at the frame frequency of 180 Hz illustrated in FIGS. 10A to 10C may further increase a range of the stereoscopic feeling of the 3D image without a distortion of the 3D image as compared with a drive of the image display device at the frame frequency of 120 Hz illustrated in FIGS. 9A and 9B.

FIGS. 11A to 11D illustrate an optical path when the image display device is driven at a frame frequency of 240 Hz in the 2D mode during 1 frame period that is time-divided into first to fourth sub-frame periods SF1 to SF4.

As shown in FIGS. 11A to 11D, when the image display device is driven at a frame frequency of 240 Hz in the 2D mode, video signals of a 2D mode format are displayed on the image display panel 35 and the white gray level voltage is supplied to all the subpixels of the active light splitting element 37. Accordingly, the active light splitting element 37 transmits light from the backlight unit 38 without a conversion of the light. In the 2D mode, because the active light splitting element 37 does not split light from the light source, the same pixels are displayed on the image display panel 35 during the first to fourth sub-frame periods SF1 to SF4. Hence, the image display device displays a 2D image.

FIGS. 12A to 12D illustrate an optical path when the image display device is driven at a frame frequency of 240 Hz in the 3D mode during 1 frame period that is time-divided into first to fourth sub-frame periods SF1 to SF4. As shown in FIGS. 12A to 12D, the image display panel 35 sequentially displays a first image $R_1G_1B_1$, a second image $R_2G_2B_2$, a third image $R_3G_3B_3$, and a fourth image $R_4G_4B_4$ that are time-divided into right and left eye images.

Figure 12A:
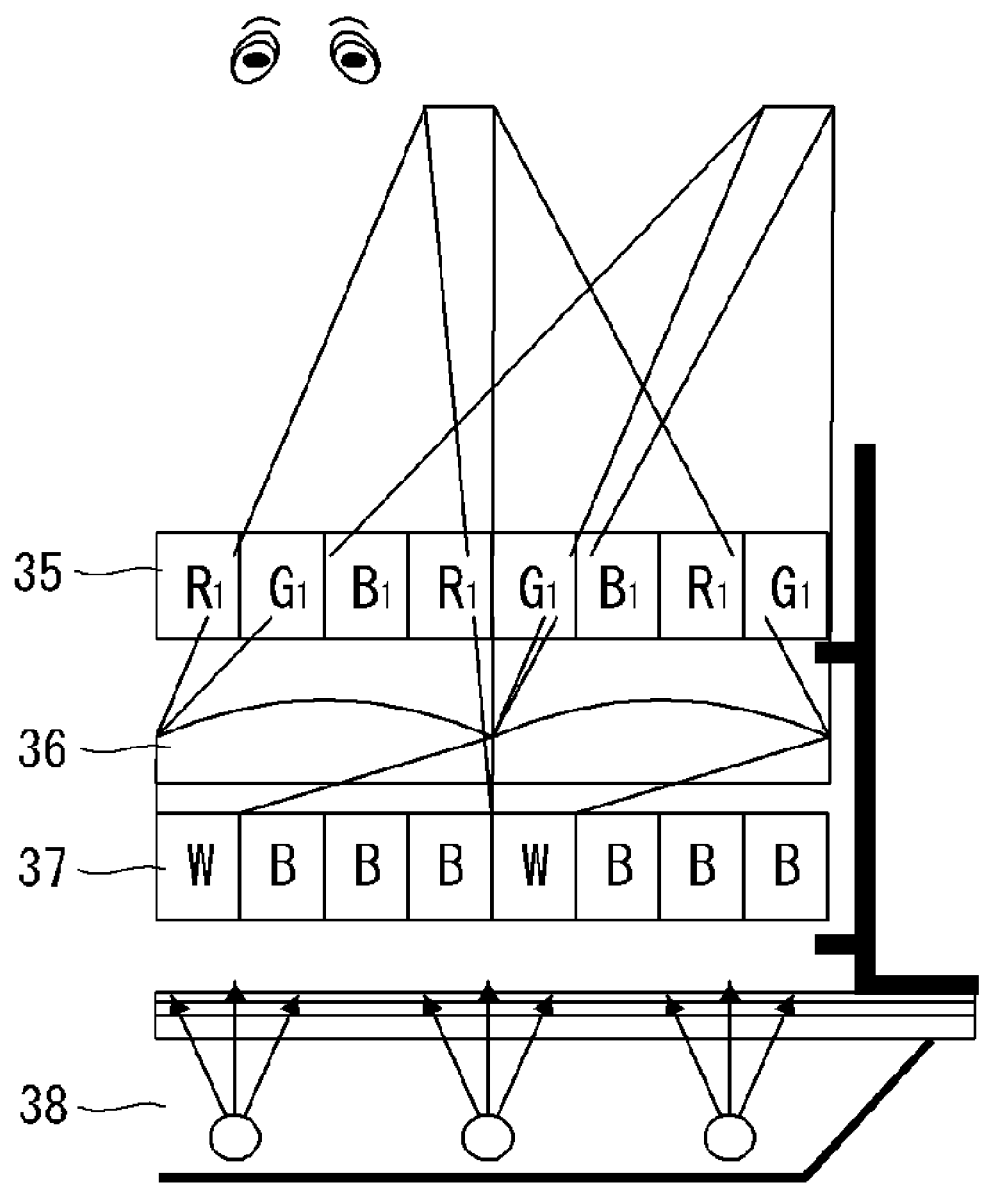
FIGS. 12A to 12D illustrate an optical path when the image display device is driven at a frame frequency of 240 Hz in a 3D mode during 1 frame period that is time-divided into first to fourth sub-frame periods.

During the first sub-frame period SF1 (i.e., 0-4.1 ms), as shown in FIG. 6, the first subpixels of the active light splitting element 37 are charged to the white gray level voltage, and the second to fourth subpixels of the active light splitting element 37 are charged to the black gray level voltage. As a result, light from the light source is spatially split by the active light splitting element 37. The pixels of the image display panel 35 display the first image $R_1G_1B_1$ during the first sub-frame period SF1 (0-4.1 ms). The lenticular lens array 36 refracts light coming from the first subpixels as shown in FIG. 12A.

Figure 12B:
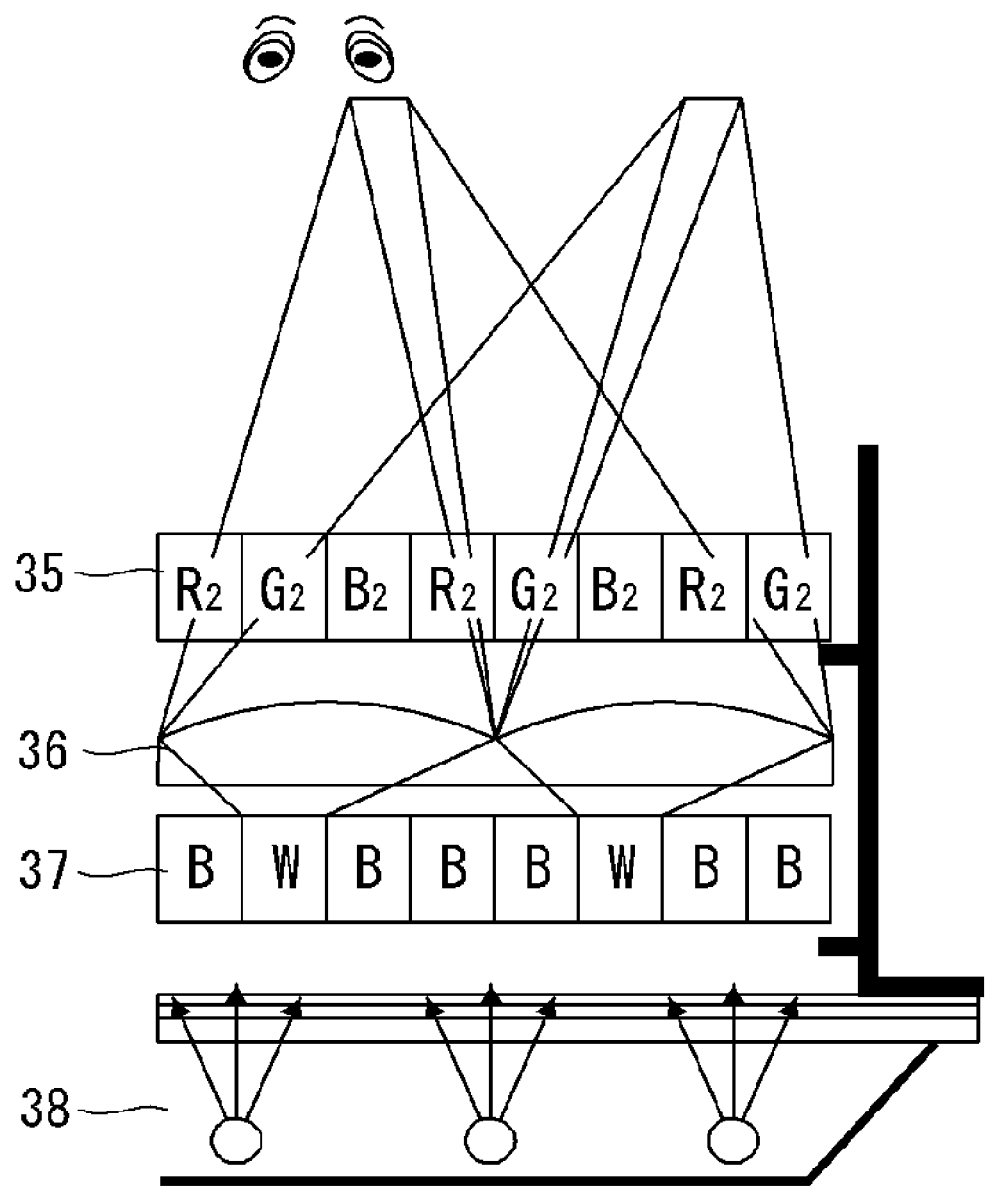

During the second sub-frame period SF2 (i.e., 4.1-8.2 ms), as shown in FIG. 6, the first, third, and fourth subpixels of the active light splitting element 37 are charged to the black gray level voltage, and the second subpixels of the active light splitting element 37 are charged to the white gray level voltage. As a result, light from the light source is spatially split by the active light splitting element 37. The pixels of the image display panel 35 display the second image $R_2G_2B_2$ during the second sub-frame period SF2 (4.1-8.2 ms). The lenticular lens array 36 refracts light coming from the second subpixels as shown in FIG. 12B. During the second sub-frame period SF2 (4.1-8.2 ms), the observer at the optimum position may watch the pixels of the image display panel 35, on which the second image $R_2G_2B_2$ is displayed, through his/her right eye.

Figure 12C:
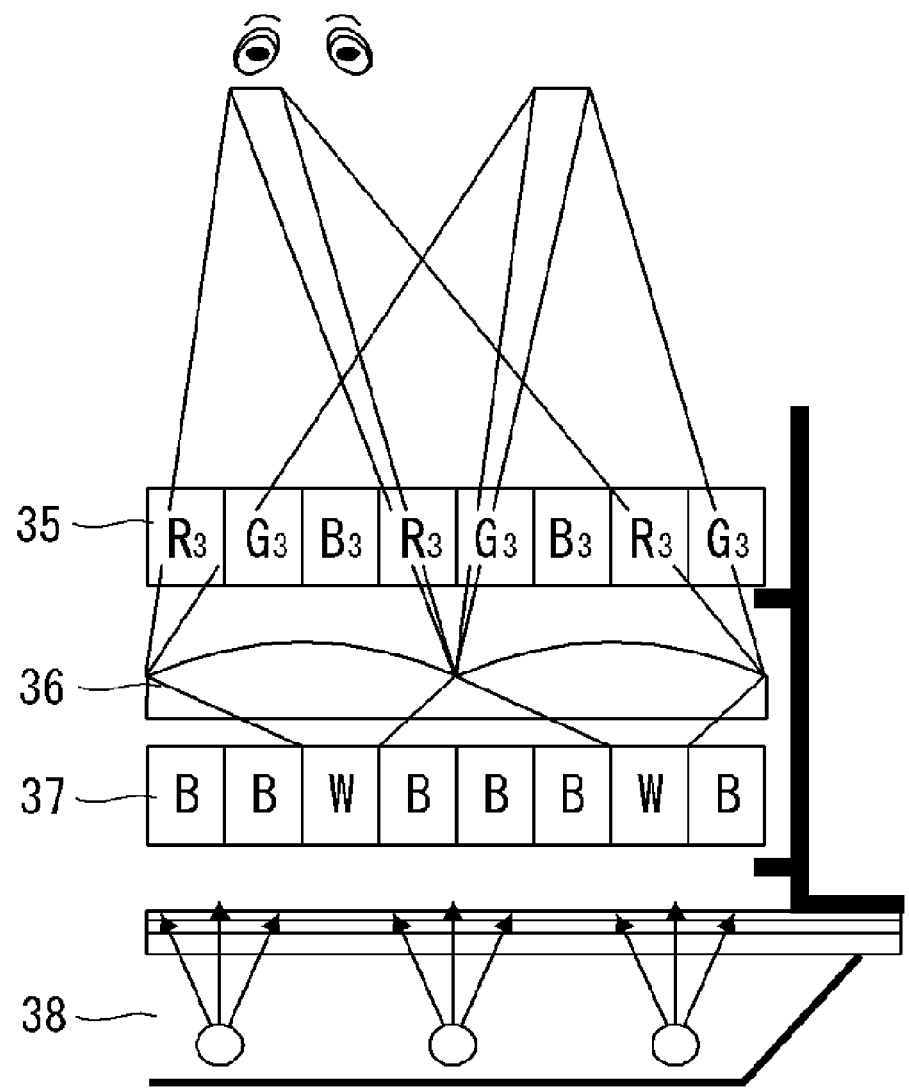

During the third sub-frame period SF2 (i.e., 8.2-12.3 ms), as shown in FIG. 6, the first, second, and fourth subpixels of the active light splitting element 37 are charged to the black gray level voltage, and the third subpixels of the active light splitting element 37 are charged to the white gray level voltage. As a result, light from the light source is spatially split by the active light splitting element 37. The pixels of the image display panel 35 display the third image $R_3G_3B_3$ during the third sub-frame period SF3 (8.2-12.3 ms). The lenticular lens array 36 refracts light coming from the third subpixels as shown in FIG. 12C. During the third sub-frame period SF3 (8.2-12.3 ms), the observer at the optimum position may watch the pixels of the image display panel 35, on which the third image $R_3G_3B_3$ is displayed, through his/her left eye. Hence, the observer may feel the stereoscopic feeling of the 3D image during the second and third sub-frame periods SF2 and SF3 through the stereoscopic technique.

Figure 12D:
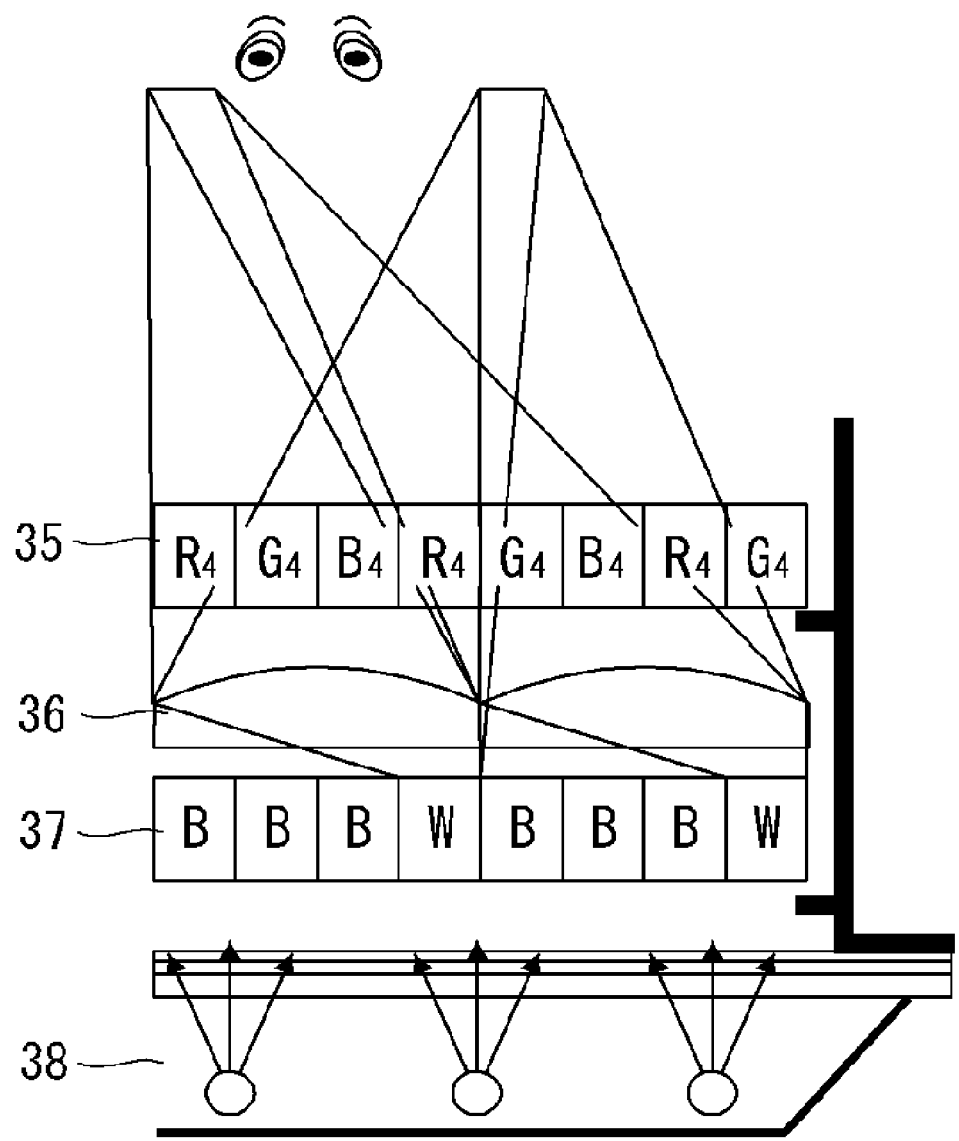

During the fourth sub-frame period SF4 (i.e., 12.3-16.4 ms), as shown in FIG. 6, the first to third subpixels of the active light splitting element 37 are charged to the black gray level voltage, and the fourth subpixels of the active light splitting element 37 are charged to the white gray level voltage. As a result, light from the light source is spatially split by the active light splitting element 37. The pixels of the image display panel 35 display the fourth image $R_4G_4B_4$ during the fourth sub-frame period SF4 (12.3-16.4 ms). The lenticular lens array 36 refracts light coming from the fourth subpixels as shown in FIG. 12D.

As shown in FIGS. 12A to 12D, the 4-view 3D image can be displayed by driving the image display device according to the embodiment of the invention at the frame frequency of 240 Hz in the 3D mode. A drive of the image display device at the frame frequency of 240 Hz illustrated in FIGS. 12A to 12D may further increase a range of the stereoscopic feeling of the 3D image without a distortion of the 3D image as compared with a drive of the image display device at the frame frequency of 180 Hz illustrated in FIGS. 10A to 10C.

Figure 13:
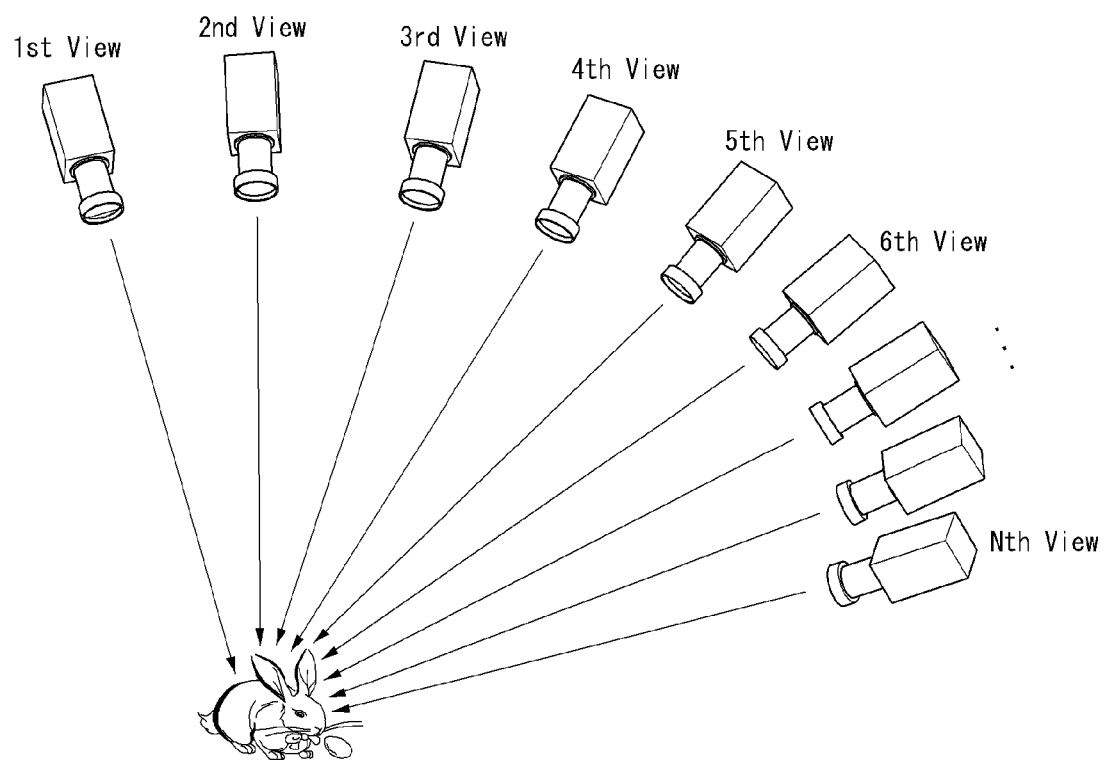
FIG. 13 schematically illustrates a multi-view 3D image.

FIG. 13 schematically illustrates a multi-view effect. As described above, the image display device according the embodiment of the invention may display an N-view (i.e., multi-view) 3D image at a frame frequency of N×60 Hz. Accordingly, as shown in FIG. 13, the observer at the optimum position may watch an object of a 3D image at various angles depending on positions of the observer.

Figure 14:
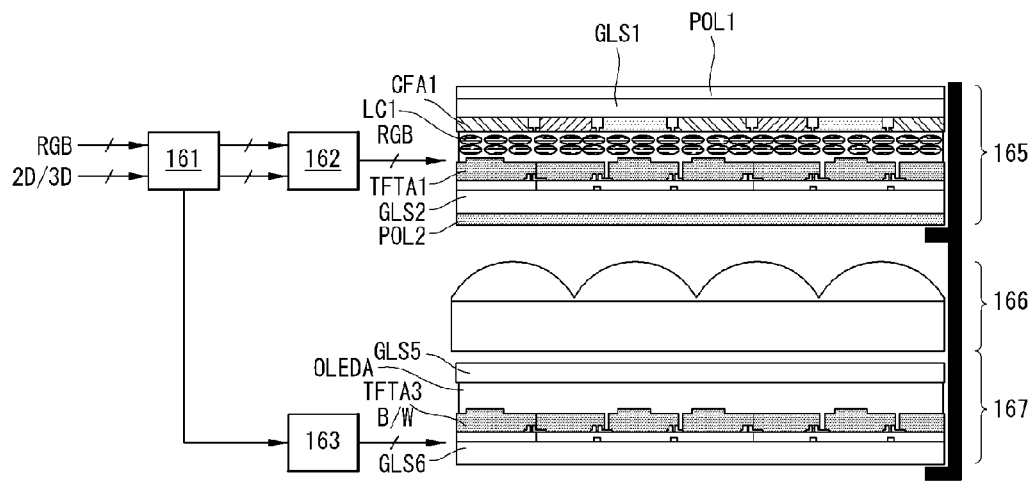
FIG. 14 is a block diagram showing an image display device according to a second exemplary embodiment of the invention.

FIG. 14 illustrates an image display device according to a second exemplary embodiment of the invention. Since a configuration of the image display device shown in FIG. 14 is substantially the same as the image display device shown in FIG. 3, a further description may be briefly made or may be entirely omitted.

As shown in FIG. 14, the image display device according to the second exemplary embodiment of the invention includes a lenticular lens array 166, an image display panel 165 on the lenticular lens array 166, and a light source module 167 under the lenticular lens array 166.

Since configurations and operations of the image display panel 165 and the lenticular lens array 166 are substantially the same as those illustrated in the first exemplary embodiment, a further description may be briefly made or may be entirely omitted.

The light source module 167 may be slimmer than the light source module 39 in the first exemplary embodiment. The light source module 167 may use a self-emission element, for example a white organic light emitting diode (OLED) panel, capable of achieving a high efficiency. The white OLED panel includes a TFF array TFTA3 between transparent substrates GLS5 and GLS6 and a white OLED array OLEDA. The TFF array TFTA3 includes a plurality of data lines, a plurality of gate lines, power supply lines, a switching TFT, a driving TFT, a storage capacitor, and the like. The white OLED panel does not include a color filter. Each of white OLEDs is individually controlled by an electrical signal supplied through the data lines and the gate line and is turned on or off. One of an anode electrode and a cathode electrode of each of the white OLEDs is connected to the driving TFT of the TFF array TFTA3. Each of the white OLEDs includes an organic compound layer including an electron injection layer (EIL), an electron transport layer (ETL), a plurality of emitting layers (EML), a hole transport layer (HTL), and a hole injection layer (HIL) that are stacked between the anode electrode and the cathode electrode. When a voltage difference between the anode electrode and the cathode electrode is equal to or greater than a threshold voltage of the white OLED, the white OLED is turned on to thereby generate white light. When the voltage difference between the anode electrode and the cathode electrode is equal to or less than the threshold voltage of the white OLED, the white OLED is turned off. The white OLEDs, as shown in FIGS. 4, 5, 7A to 12D, are time-division driven and sequentially shift the white pattern into the black pattern or the black pattern into the white pattern. Hence, the white OLEDs time-splits spatially light from the light source.

The lenticular lens array 166 and the light source module 167 uniformly irradiate light onto the image display panel 165 in a 2D mode and horizontally split light passing through the lenticular lens array 166 in a 3D mode. R, G, and B data voltages arranged in a 2D data format are supplied to the image display panel 165 in the 2D mode, and R, G, and B data voltages arranged in a 3D image data format are supplied to the image display panel 165 in the 3D mode. The image display panel 165 and the light source module 167 are driven at a predetermined frame rate so that they synchronize with each other.

A frame 170 stably supports the image display panel 165, the lenticular lens array 166, and the light source module 167 and separates the above elements 165, 166, and 167 at a proper distance from each other.

If the image display panel 165 and the light source module 167 are driven at a frame frequency corresponding to a multiple of an integer of 60 Hz (i.e., at a frame frequency of N×60 Hz, where N is an integer equal or greater than 1), an N-view 3D image may be displayed.

The image display device according to the second exemplary embodiment of the invention includes a first driver 162 for driving the image display panel 165, a second driver 163 for driving the light source module 167, and a controller 161.

The first driver 162 includes a data drive circuit for supplying the R, G, and B data voltages to the data lines of the image display panel 165 and a gate drive circuit for sequentially supplying gate pulses to the gate lines of the image display panel 35. The data drive circuit of the first driver 162 converts RGB digital video data received from the controller 161 into an analog gamma voltage to generate the R, G, and B data voltages and supplies the R, G, and B data voltages to the data lines of the image display panel 165 under the control of the controller 161.

The second driver 163 includes a data drive circuit for supplying a white gray level voltage and a black gray level voltage to the data lines of the light source module 167 and a gate drive circuit for sequentially supplying gate pulses to the gate lines of the light source module 167. The data drive circuit of the second driver 163 converts digital white data received from the controller 161 into a gamma voltage with a peak white gray level in the 2D mode to generate white gray level voltages and supplies the white gray level voltages to the data lines of the light source module 167 under the control of the controller 161. The data drive circuit of the second driver 163 converts digital white data and digital black data received from the controller 161 into a gamma voltage with a peak white gray level and a gamma voltage with a peak black gray level in the 3D mode to generate white gray level voltages W and black gray level voltages B and supplies the white gray level voltages W and the black gray level voltages B to the data lines of the light source module 167 under the control of the controller 161.

The controller 161 controls the first and second drivers 162 and 163 so that the first and second drivers 162 and 163 operate in conformity with the 2D or 3D mode in response to a 2D or 3D mode selection signal a user inputs through a user interface or a 2D/3D identification code extracted from an input video signal. The controller 161 supplies the RGB digital video data to the data drive circuit of the first driver 162 and supplies the digital white data and the digital black data to the data drive circuit of the second driver 163. In the 2D mode, the controller 161 rearranges the RGB digital video data in the 2D data format and supplies the RGB digital video data of the 2D data format to the data drive circuit of the first driver 162. In the 2D mode, the controller 161 supplies the digital white data to the data drive circuit of the second driver 163. In the 3D mode, the controller 161 rearranges the RGB digital video data in the 3D data format and supplies the RGB digital video data of the 3D data format to the data drive circuit of the first driver 162. In the 3D mode, the controller 161 alternately supplies the digital white data and the digital black data to the data drive circuit of the second driver 163. In the 3D mode, the white gray level voltage and the black gray level voltage generated by the second driver 163 are supplied to the light source module 167. Hence, a white pattern transmitting light and a black pattern shielding light alternately appear on the active light splitting element 37. Locations of the white pattern and the black pattern are reversed every 1 frame period/N. The liquid crystal cells of the light source module 167 charged to the white gray level voltage transmit light at a maximum transmittance, and the liquid crystal cells of the light source module 167 charged to the black gray level voltage shield light (i.e., are driven at a minimum transmittance).

The controller 161 receives timing signals, such as horizontal and vertical sync signals, a data enable signal, a dot clock signal to generate timing control signals for controlling operation timing of the first and second drivers 162 and 163. The controller 161 multiplies the timing control signals in a multiple of an integer and allows the first and second driver 162 and 163 to be driven at a frame frequency of N×60 Hz. In this case, the controller 161 rearranges the RGB video data supplied to the data drive circuit of the first driver 162 in conformity with a multi-view 3D format so that a multi-view 3D image is displayed in the 3D mode.

In the image display device according to the second exemplary embodiment of the invention and a method of driving the same, the 2D mode and the 3D mode may be switched. Since operations of the 2D mode and the 3D mode in the second exemplary embodiment are substantially the same as the first exemplary embodiment illustrated with reference to FIGS. 10A to 15D, a further description may be briefly made or may be entirely omitted.

Figure 15:
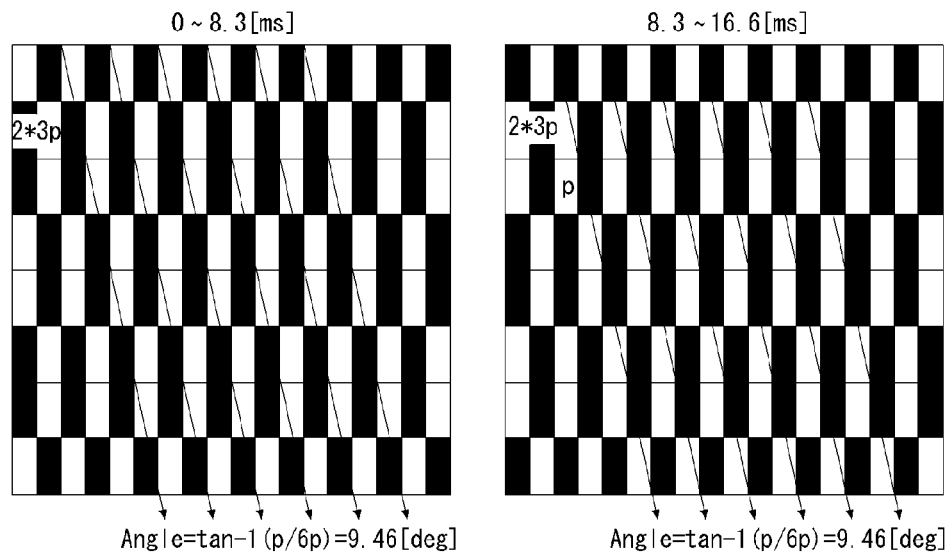
FIG. 15 illustrates an exemplary inclination angle of a lenticular lens array to subpixels of a light source module.

In the first and second exemplary embodiments, as shown in FIG. 15, the white pattern and the black pattern displayed on each of the light source modules 39 and 167 may alternate with each other up and down and in right and left. The subpixels of the light source modules 39 and 167 and the lenticular lens arrays 36 and 166 may be positioned parallel to each other. The lenticular lens arrays 36 and 166 may incline to the subpixels of the light source modules 39 and 167 at a predetermined angle. In case the lenticular lens arrays 36 and 166 incline to the subpixels of the light source modules 39 and 167, it is preferable that the white pattern and the black pattern of the light source modules 39 and 167 are symmetrical in the center of the lenticular lens so as to reduce Moire. Because a pitch of the subpixel of the light source module included in a pitch of the lenticular lens changes depending on a frame frequency, an inclination angle of the lenticular lens arrays 36 and 166 to the subpixels of the light source modules 39 and 167 may change depending on the frame frequency. It is preferable that the inclination angle is 0 to 15°

FIG. 15 illustrates an exemplary inclination angle of the lenticular lens arrays 36 and 166 to the subpixels of the light source modules 39 and 167. In FIG. 15, the inclination angle of the lenticular lens arrays 36 and 166 is 9.46°, and the light source modules 39 and 167 are driven at a frame frequency of 120 Hz.

As described above, in the image display device and the method of driving the same according to the embodiments of the invention, the light source module, that operates as the surface light source in the 2D mode and operates as the line light source in the 3D mode by the electrical control, and the lenticular lens array are positioned under the backlit display element, that displays the 2D format image in the 2D mode and displays the 3D format image in the 3D mode. Hence, the 3D image can be displayed on the backlit display element without a resolution reduction, the 2D and 3D images can be easily controlled, and the multi-view 3D image can be displayed on the backlit display element.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display device, comprising:
a lenticular lens array;
a first backlit display element that is positioned on the lenticular lens array and is driven at a frame frequency of N×60 Hz, where N is an integer equal to or greater than 2; and
a light source module that is positioned under the lenticular lens array and irradiates light onto the lenticular lens array using a plurality of electrically individually controllable pixels,
wherein the first backlit display element displays a video signal of a 2-dimensional (2D) format in a 2D mode and displays a video signal of an N-view 3-dimensional (3D) format in a 3D mode,
wherein the light source module irradiates light in the form of a surface light source onto the lenticular lens array in the 2D mode and irradiates light in the form of a plurality of line light sources, that are spaced apart from one another at a uniform distance, onto the lenticular lens array in the 3D mode, and
wherein a number of subpixels included in each pixel of the light source module is N in the 3D mode when a frame frequency of each of the first backlit display element and the light source module is N×60 Hz.

2. The image display device of claim 1, wherein the light source module includes:
a backlight unit including a light source, the backlight unit generating light through the light source; and
a second backlit display element between the backlight unit and the lenticular lens array, the second backlit display element including a plurality of electrically individually controllable pixels.

3. The image display device of claim 2, wherein:
the second backlit display element synchronizes with the first backlit display element and is driven at a frame frequency of N×60 Hz; and
the second backlit display element transmits light from the backlight unit without a conversion of the light in the 2D mode and partially shields light from the backlight unit in the 3D mode.

4. The image display device of claim 3, wherein:
the second backlit display element includes a thin film transistor (TFT) array between first and second transparent substrates, each of which is attached to a polarizing plate, and a liquid crystal layer that is individually turned on or off in each of the pixels by the TFT array; and
the second backlit display element does not include a color filter.

5. The image display device of claim 1, wherein the light source module includes a self-emitting element that is positioned under the lenticular lens array and includes a plurality of electrically individually controllable pixels.

6. The image display device of claim 5, wherein:
the self-emitting element synchronizes with the first backlit display element and is driven at a frame frequency of N×60 Hz; and
the self-emitting element operates as a surface light source in the 2D mode and operates as a plurality of line light sources in the 3D mode.

7. The image display device of claim 6, wherein:
the self-emitting element includes a thin film transistor (TFT) array and a white organic light emitting diode (OLED) element that is individually turned on or off in each of the pixels by the TFT array; and
the self-emitting element does not include a color filter.

8. The image display device of claim 1, wherein an angle between the subpixel of the light source module and the lenticular lens array is 0 to 15°.

9. The image display device of claim 8, wherein, when the first backlit display element is driven at the frame frequency of N×60 Hz, the first backlit display element time-division displays an image of the N-view 3D format in the 3D mode during N sub-frame periods of one frame period corresponding to 1/60 sec.

10. The image display device of claim 9, wherein the light source module shifts the light in the form of the plurality of line light sources every the sub-frame period in the one frame period in the 3D mode.

11. A method of driving an image display device, comprising:
positioning a first backlit display element on a lenticular lens array to drive the first backlit display element at a frame frequency of N×60 Hz, where N is an integer equal to or greater than 2;
positioning a light source module including a plurality of electrically individually controllable pixels under the lenticular lens array to irradiate light onto the lenticular lens array;
controlling light from the light source module into light in the form of a surface light source in a 2-dimensional (2D) mode to display a video signal of a 2D format on the first backlit display element; and
controlling light from the light source module into light in the form of a plurality of line light sources, that are spaced apart from one another at a uniform distance, in a 3-dimensional (3D) mode to display a video signal of an N-view 3D format on the first backlit display element and
setting a number of subpixels included in one pixel of the light source module to N in the 3D mode when a frame frequency of each of the first backlit display element and the light source module is N×60 Hz.

12. The method of claim 11, wherein displaying the video signal of the N-view 3D format includes:
time-division driving the first backlit display element so that the first backlit display element is driven at the frame frequency of N×60 Hz, and an image of the N-view 3D format is time-division displayed during N sub-frame periods of one frame period corresponding to 1/60 sec in the 3D mode; and
time-division driving the light source module so that the light source module synchronizes with the first backlit display element to shift the light in the form of the plurality of line light sources during the one frame period.

13. The method of claim 12, wherein an angle between the subpixel of the light source module and the lenticular lens array is 0 to 15°.

* * * * *